United States Patent
Meli et al.

(10) Patent No.: US 6,259,555 B1
(45) Date of Patent: Jul. 10, 2001

(54) MULTI-BAND AMPLIFICATION SYSTEM FOR DENSE WAVELENGTH DIVISION MULTIPLEXING

(75) Inventors: Fausto Meli, Piacenza; Gianpaolo Barozzi, Cinisello Balsamo; Stefano Piciaccia; Stefano Aina, both of Milan; Silvia Turolla, Monza, all of (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/494,783

(22) Filed: Jan. 31, 2000

Related U.S. Application Data

(63) Continuation of application No. PCT/EP98/03967, filed on Jun. 29, 1998
(60) Provisional application No. 60/055,065, filed on Aug. 8, 1997.

(30) Foreign Application Priority Data

Aug. 1, 1997 (EP) .................................................. 97113332

(51) Int. Cl.$^7$ ........................... H04J 14/02; H04B 10/17; H01S 3/06
(52) U.S. Cl. ......................... 359/337; 359/341; 359/349; 359/133
(58) Field of Search ..................................... 359/126, 133, 359/337, 341, 349

(56) References Cited

U.S. PATENT DOCUMENTS

| | | | |
|---|---|---|---|
| 5,260,823 | 11/1993 | Payne et al. | 359/341 |
| 5,392,154 | 2/1995 | Chang et al. | 359/341 |
| 5,452,116 | 9/1995 | Kirkby et al. | 359/124 |
| 5,563,733 | 10/1996 | Mitsuda et al. | 359/341 |
| 5,608,571 | 3/1997 | Epworth et al. | 359/341 |
| 5,677,786 * | 10/1997 | Meli | 359/341 |
| 6,049,417 * | 4/2000 | Srwastana et al. | 359/341 |

FOREIGN PATENT DOCUMENTS

| | | |
|---|---|---|
| 0 445 364 | 9/1991 | (EP) . |
| 0 695 049 | 1/1996 | (EP) . |
| 0 695 050 | 1/1996 | (EP) . |
| WO 97/50203 | 12/1997 | (WO) . |

OTHER PUBLICATIONS

Yamada et al, Electronics Letters, Apr. 10, 1997, vol. 33, #8, pp 710–711.*
Yamada et al, OSA Tops vol. 16, pp 14–25, Apr. 1997.*
Sun et al, Optical Amplifiers and their applications, Optical Society of America, pp 144–147, 1977.*

* cited by examiner

Primary Examiner—Nelson Moskowitz
(74) Attorney, Agent, or Firm—Finnegan, Henderson, Farabow, Garrett & Dunner, L.L.P.

(57) ABSTRACT

An optical transmission system has been designed to optimize the use of the spectral emission range of rare-earth-doped fiber amplifiers. The system includes a wide band of channels in the spectral emission range of erbium-doped fiber amplifiers, which is split into two sub-bands, a low sub-band corresponding to the low end of the range and a high sub-band corresponding to the high end of the range. The two sub-bands are separately amplified and optimized, and then recombined without significant competition between the two sub-bands. In addition, an equalizing filter, such as a specialized Bragg filter or interferential filter, is applied to the low sub-band instead of the entire band of channels, thus greatly reducing any equalization need or unequalization effects. In an optical line amplifier for the system, the wide band is amplified in a first stage of a fiber amplifier that operates in a linear condition, the wide band is split into the two sub-bands, and one or the two sub-bands is amplified with the second stage of the fiber amplifier that operates in a saturation condition.

14 Claims, 19 Drawing Sheets

| System | 25 Gb/s | | | | | | 10Gb/s |
|---|---|---|---|---|---|---|---|
| | 8ch (2+8) | 8ch (LB) | 8ch (HB) | 16ch (HB) | 16ch (4+12) | 32ch (8+24) | 8ch (2+6) |
| Link (spans) | | | | | | | |
| 7 | 30.5 | 24.5 | 29.5 | 26.5 | 27.5 | 24 | 25.5 |
| 6 | 31 | 25 | 30 | 27 | 28 | 25 | 26 |
| 5 | 32 | 26 | 31 | 28 | 29 | 26 | 27 |
| 4 | 33 | 27 | 32 | 29 | 30 | 27 | 28 |
| 3 | 34 | 28 | 33 | 30 | 31 | 28 | 29 |
| 2 | 36 | 30 | 35 | 32 | 33 | 30 | 31 |
| 1 | 39 | 33 | 38 | 35 | 36 | 33 | 34 |

FIG. 12

MULTI-BAND AMPLIFICATION SYSTEM FOR DENSE WAVELENGTH DIVISION MULTIPLEXING

This application is a continuation of International Application No. PCT/EP98/03967, filed Jun. 29, 1998, the content of which is incorporated herein by reference and claims the benefit of U.S. Provisional Application No. 60/055,065, filed Aug. 8, 1997.

BACKGROUND OF THE INVENTION

The present invention relates generally to the field of wavelength division multiplexing within optical transmission systems, and more particularly to the field of wavelength division multiplexing using band separation within a generic spectral emission range of a rare-earth-doped fiber amplifier.

In optical transmission systems, optical fibers doped with rare-earth elements such as erbium provide a useful component for amplifying signals passing across a long distance link. These fiber amplifiers, when pumped with a first characteristic wavelength, provide gain to a transmission signal at a second characteristic wavelength. When erbium is used as the rare-earth dopant, the pump wavelength typically is either 980 nm or 1480 nm, which results in a stimulated emissionspectrum for the amplifier across a band of about 1528–1562 nm. Therefore, the erbium-doped fiber amplifier will amplify transmission signals passing through it at these wavelengths.

An optical transmission system using erbium-doped fiber amplifiers, however, suffers from several limitations due to the emission characteristics of the amplifier across the wavelength range. For one, the spectral emission of the erbium fiber is non-flat across the wavelength band of 1528–1562. As a result, only a narrow band of wavelengths have conventionally been used to obtain equivalent gain across the band. Many systems have chosen 1550 nm and its surrounding wavelengths as the narrow band due to the relatively flat response of the erbium-doped fiber amplifier in this region. When a high number of channels using dense wavelength division multiplexers (WDM) are applied to the erbium-doped fiber amplifier, techniques such as equalizing means must be employed in an attempt to flatten the gain of the amplifier across the bandwidth of the system. These equalizing means encumber system design. In addition, the cascading of amplifiers in a large WDM system compounds the issues with non-flat gain and imposes further fundamental limitations on system design.

FIG. 1 is a graph of a generalized spectral emission range of 1528–1562 nm for an erbium-doped fiber amplifier showing the different gain for channels of signals traveling through an optical communication link including the erbium-doped fiber. As shown in FIG. 1, the gain in a lower region between 1528 nm and 1541 nm is non-flat, whereas the gain in the higher region is mostly flat. In WDM systems, discrete wavelengths within a small tolerance, otherwise known as channels, are used to carry modulated information. For channels in the lower region, the disparity in gain for signals passing through an erbium-doped fiber amplifier may cause unequal amplification among the channels. The disparity becomes more significant when the channels pass though a cascade of amplifiers that have similar gain characteristics. The differences in gain among the channels can become extreme enough to cause channels with very low gain to fall below a predetermined noise cutoff level. The performance specifications of a receiver positioned downstream from the amplifiers may dictate the noise cutoff level. Channels falling below the noise cutoff are not detected, or detected poorly, effectively eliminating those channels or reducing their reliability.

To overcome the gain disparity problems, optical transmission systems have used equalizing devices such as notch filters as a dual core fiber, interferential filters, long period grating, chirped gratings, or hybrid active fiber, for example, to flatten the gain characteristic. Some of these techniques are discussed in U.S. Pat. No. 5,260,823. However, these equalizing devices are only effective in limited applications, such as linear conditions, and are thus liable to maintain continued gain disparities when applied to the erbium-doped fiber spectral emission range of 1528–1562 nm. Thus, due to the potentially large gain disparities in the lower channel region and the corresponding problems of flattening the gain characteristics, optical transmission systems have been limited to using the higher end of the erbium-doped fiber amplifier spectral emission range.

U.S. Pat. No. 5,392,154 proposes a self-regulating multiwavelength optical amplifier module providing desired channel-by-channel power regulation and immunity to transient interchannel cross-saturation. The proposed amplifier module includes a plurality of pump-shared parallel fiber amplifiers operated in gain-saturation and connected between a demultiplexer and a multiplexer. Each of the fiber amplifiers individually amplifies one channel at a single wavelength. An optional first gain stage comprising a strongly pumped erbium-doped fiber amplifier improves performance with higher optical signal-to-noise ratio.

E.P. Patent Application No. 445,364A proposes an optical fiber communication system providing a connection between a central station and a number of subscriber stations and including an optical amplifier (OV) having wavelength selective couplers at input and output adapted to direct a first wavelength λ1 into the amplifier and a second wavelength λ2 into a bridging conductor (U).

U.S. Pat. No. 5,452,116 discloses a wavelength division multiplexed optical transmission system incorporating a concatenation of optical amplifiers. The multiplexed signal passes through a limited number of amplifiers in which all channels are amplified together. Then, the signal is demultiplexed and the individual channels are separately amplified and then remultiplexed together. In instances where a set of channels may be grouped into subsets of channels for which the individual channel spacing is so close that any differential amplification is negligible, then the set may be amplified separately from another set.

Similarly, U.S. Pat. No. 5,608,571 discloses an optical amplifier for a WDM system that has a set of optically amplifying fibers arranged with an associated spectrally selective Bragg reflector. Different spectral components of an input signal propagate through different ones of the optically amplifying fibers based on the reflection band of the associated Bragg reflectors and return to a transmission path.

U.S. Pat. No. 5,563,733 discloses an apparatus for optically amplifying a plurality of signals having different wavelengths where a first signal among the plurality propagates through a part of a series of rare-earth-doped optical fibers and a second signal among the plurality propagates through all of the series of rare-earth-doped optical fibers. The disclosed arrangement aims to provide an equalizing gain for signals having different input powers, for example a digital signal that has a small input power and an analog signal that has a large input power. A WDM coupler separates the analog signal before it passes through all of a series of fiber amplifiers.

Applicants have discovered that the limited region in the erbium-doped fiber amplifier spectral emission range used for transmitting signals does not fulfill the needs of dense WDM systems, particularly WDM systems having sixteen or more channels and using erbium-doped fiber amplifiers. Applicants have found that the prior arrangements of separating certain types of signals from a cascade of amplifiers or separately amplifying groups of channels having negligible differential amplification fall short of fulfilling the needs of dense WDM systems.

Applicants have observed that prior art approaches. may suffer from having the power of individual output channels not be independent from the other channels. Moreover, Applicants have observed that when band-separated equalizing techniques are employed within the stages of amplification in a WDM system, the power of the channels as well as the spectra can be effectively separated and made independent. In this way, relatively consistent output power between channels of a dense WDM system can be obtained, and the power performance of the channels of a sub-band can be made relatively independent of the presence or absence of channels in other sub-bands.

SUMMARY OF THE INVENTION

In accordance with the present invention, an optical transmission system has been designed to optimize the use of the erbium spectral emission range. The system includes a wide band of channels in the erbium spectral emission range, which is split into two sub-bands-a low sub-band corresponding to the low wavelength end of the range and a high sub-band corresponding to the high wavelength end of the range. The two subbands are separately amplified and optimized, and then recombined without significant competition between the two sub-bands and with reduced gain tilt effects. In addition, an equalizing filter, such as a specialized Bragg filter like a long period grating, or an interferential filter is applied to the low sub-band instead of the entire band of channels, thus greatly reducing any equalization need or unequalization effect.

To obtain the advantages and in accordance with the purpose of the invention, as embodied and broadly described herein, an optical communication system for transmitting optical channels between a transmitter and a receiver using wavelength division multiplexing includes a wavelength multiplexer optically coupled to the transmitter for multiplexing individual optical channels, a transmitter power amplifier optically coupled to the wavelength multiplexer for amplifying the multiplexed optical channels, at least one optical line amplifier being optically coupled to the transmitter power amplifier via an optical transmission fiber, a receiver power amplifier optically coupled to the at least one line amplifier via another optical transmission fiber, and a wavelength demultiplexer optically coupled to the receiver power amplifier far separating the multiplexed optical channels into the individual optical channels for passage to the receiver. The optical line amplifier includes a first stage of a first fiber amplifier for amplifying the multiplexed optical channels, a first band separation filter optically coupled to an output of the first stage for splitting the multiplexed optical channels into a first band of wavelengths and a second band of wavelengths, a second stage of the first fiber amplifier optically coupled to the band separation filter, a second fiber amplifier optically coupled to the band separation filter and having a first wavelength response characteristic for amplifying the first band, an equalizing filter positioned between the band separation filter and the second amplifier for equalizing the amplification of signals in the first band, a third fiber amplifier optically coupled to the second stage and having a second wavelength response characteristic different from the first wavelength response characteristic for amplifying the second band, and a combiner for multiplexing the first amplified band and the second amplified band back into the multiplexed optical channels.

In addition, an optical line amplifier for amplifying a plurality of multiplexed channels traveling in a wavelength division multiplexing system includes a first optical amplifier, optically coupled to receive the multiplexed channels, having a first stage operating in a linear mode and a second stage operating in a saturation mode; and a band separation filter positioned between the first stage and the second stage for passing a first group of the multiplexed channels into the second stage and separating a second group of the multiplexed channels from entering the second stage; a second optical amplifier, optically coupled to an output of the second stage, having a first wavelength response characteristic for amplifying the first group of the multiplexed channels; a third optical amplifier, optically coupled to the band separation filter, having a second wavelength response characteristic different from the first wavelength response characteristic for amplifying the second group of the multiplexed channels; and an equalization filter positioned between the band separation filter and the third optical amplifier for flattening the gain response of the third optical amplifier for the second group of the multiplexed channels.

Furthermore, a method for transmitting optical signals, includes the steps of amplifying a multiplexed signal having a plurality of optical channels with a first stage of a first amplifier operating in a linear condition; splitting the multiplexed signal into a first wavelength band; and a second wavelength band, and amplifying the first wavelength band with a second stage of the first amplifier operating in a saturation condition; amplifying the first wavelength band after the second stage with a second amplifier having a first wavelength response characteristic; filtering the second wavelength band to flatten a gain response; and amplifying the second wavelength band with a third amplifier having a second wavelength response characteristic different from the first wavelength response characteristic.

It is to be understood that both the foregoing general description and the following detailed description are exemplary and explanatory only and are not restrictive of the invention, as claimed. The following description, as well as the practice of the invention, set forth and suggest additional advantages and purposes of this invention.

BRIEF DESCRIPTION OF THE DRAWINGS

The accompanying drawings, which are incorporated in and constitute a part of this specification, illustrate embodiments of the invention and, together with the description, explain the advantages and principles of the invention.

FIG. 12 is a chart of preferred attenuation for various spans and system configurations for the present invention.

DESCRIPTION OF THE PREFERRED EMBODIMENT

Figure 1:
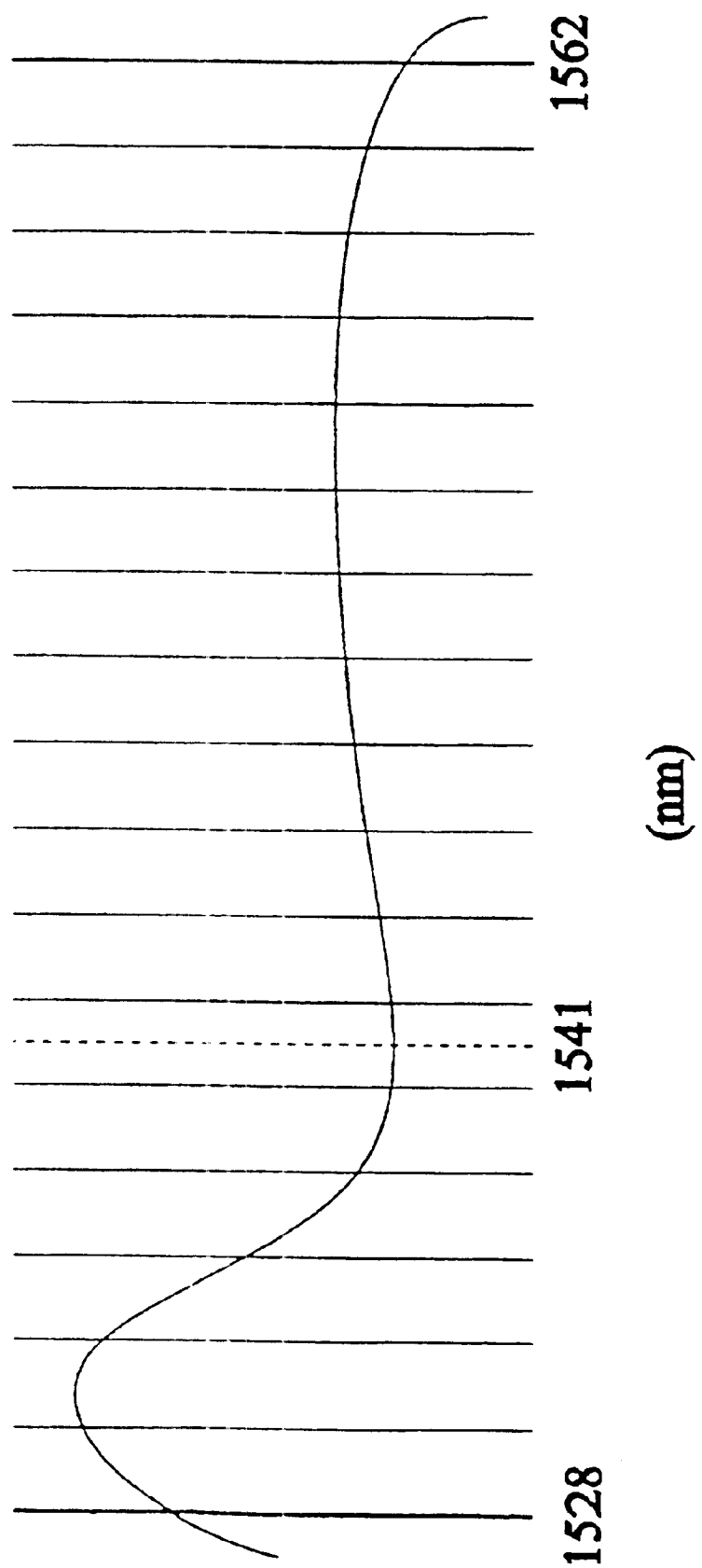
FIG. 1 is a graph of a gain characteristic for an erbium-doped fiber spectral emission range.

Reference will now be made to various embodiments according to this invention, examples of which are shown in the accompanying drawings and will be obvious from the description of the invention. In the drawings, the same reference numbers represent the same or similar elements in the different drawings whenever possible.

Figure 2:
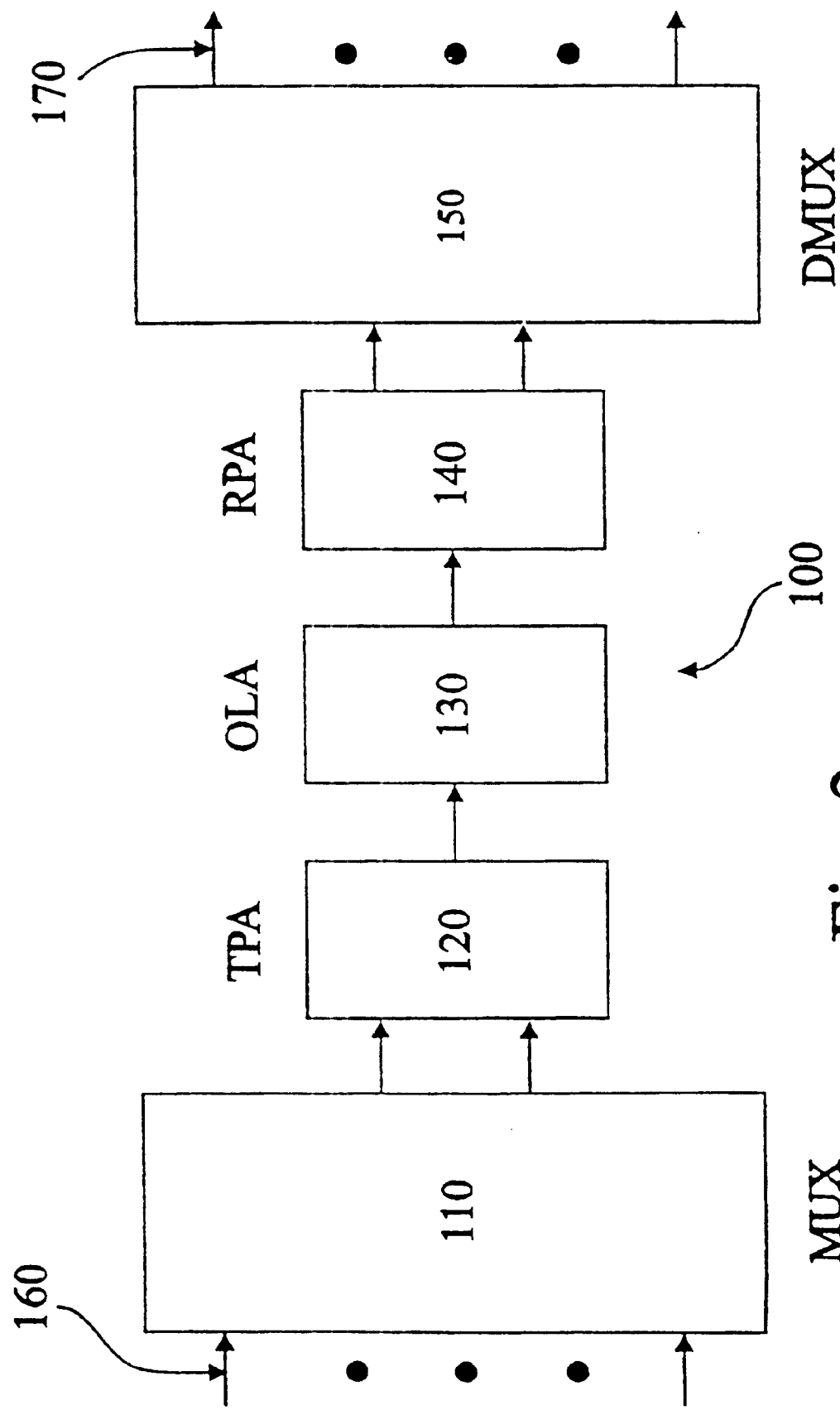
FIG. 2 is a block diagram of an optical transmission system consistent with the present invention.

This invention relates to an optical transmission system that optimizes the use of the spectral emission range of an erbium-doped fiber amplifier. The following describes the general layout of the optical transmission system consistent with the present invention. Referring to FIG. 2, optical transmission system 100 includes a multiplexing section (MUX) 110, a transmitter power amplifier (TPA) section 120, at least two sections of longdistance optical transmission fiber (not shown), an optical line amplifier (OLA) section 130 positioned between every two sections of optical transmission fiber, a receiver pre-amplifier (RPA) section 140, and a demultiplexing section (DMUX) 150. Optical transmission system 100 further includes a plurality of input channels 160 and a plurality of output channels 170.

Input channels 160 may, for example, include 8, 16, or 32 channels, each having a distinct carrier wavelength, or some other total of channels depending on the needs and requirements of the particular optical transmission system. Each input channel 160 is received by multiplexing section 110. As shown in FIG. 2, multiplexing section 110 multiplexes or groups input channels 160 preferably into two sub-bands, although multiplexing section 110 could alternatively group input channels 160 into a single wide-band or a number of sub-bands greater than two.

The two preferable sub-bands produced by multiplexing section 110 are then received, as separate sub-bands or as a combined wide-band, in succession by TPA section 120, at least one OLA section 130, and RPA section 140. Sections of optical transmission fiber (not shown) adjoin the at least one OLA section 130 with TPA section 120, RPA section 140, and possibly with other OLA sections (not shown). TPA section 120 receives the separate sub-bands from multiplexing section 110, amplifies and optimizes them, and then combines them into a single wide-band. A first section of optical transmission fiber (not shown) couples the output of TPA section 120 to OLA section 130. OLA section 130 receives the single wide-band and re-divides it into the two sub-bands. OLA section 130 amplifies and optimizes the two sub-bands and then recombines them into the single wide-band. A second section of optical transmission fiber (not shown) couples the output of the OLA section 130 to either another OLA section (not shown) or to RPA section 140. RPA section 140 also amplifies and optimizes the single wide-band and may split the single wide-band into the two sub-bands before outputting them.

Demultiplexing section 150 then receives the two sub-bands from RPA section 140. Demultiplexing section 150 splits the two sub-bands into the individual wavelengths of output channels 170. In general, the number of output channels 170 will be the same as the number of input channels 160. However, some channels may be either added or dropped by optical transmission system 100 between multiplexing section 110 and demultiplexing section 150 by an optical add/drop multiplexer (OADM), described further below. Consequently, the number of input channels 160 and output channels 170 may be unequal in some circumstances.

As shown in FIG. 2, multiplexing section 110 preferably groups input channels 160 into two sub-bands. Both sub-bands are within the spectral emission range of the optical fiber amplifiers used in TPA 120, OLA 130, and RPA 140. In a preferred embodiment, the fiber amplifiers in those sections of WDM system 100 are erbium-doped fiber amplifiers. As a result, the two sub-bands fall between 1528 nm and 1562 nm. One sub-band is referred to as a low band (LB) and the other as a high band (HB).

Figure 3:
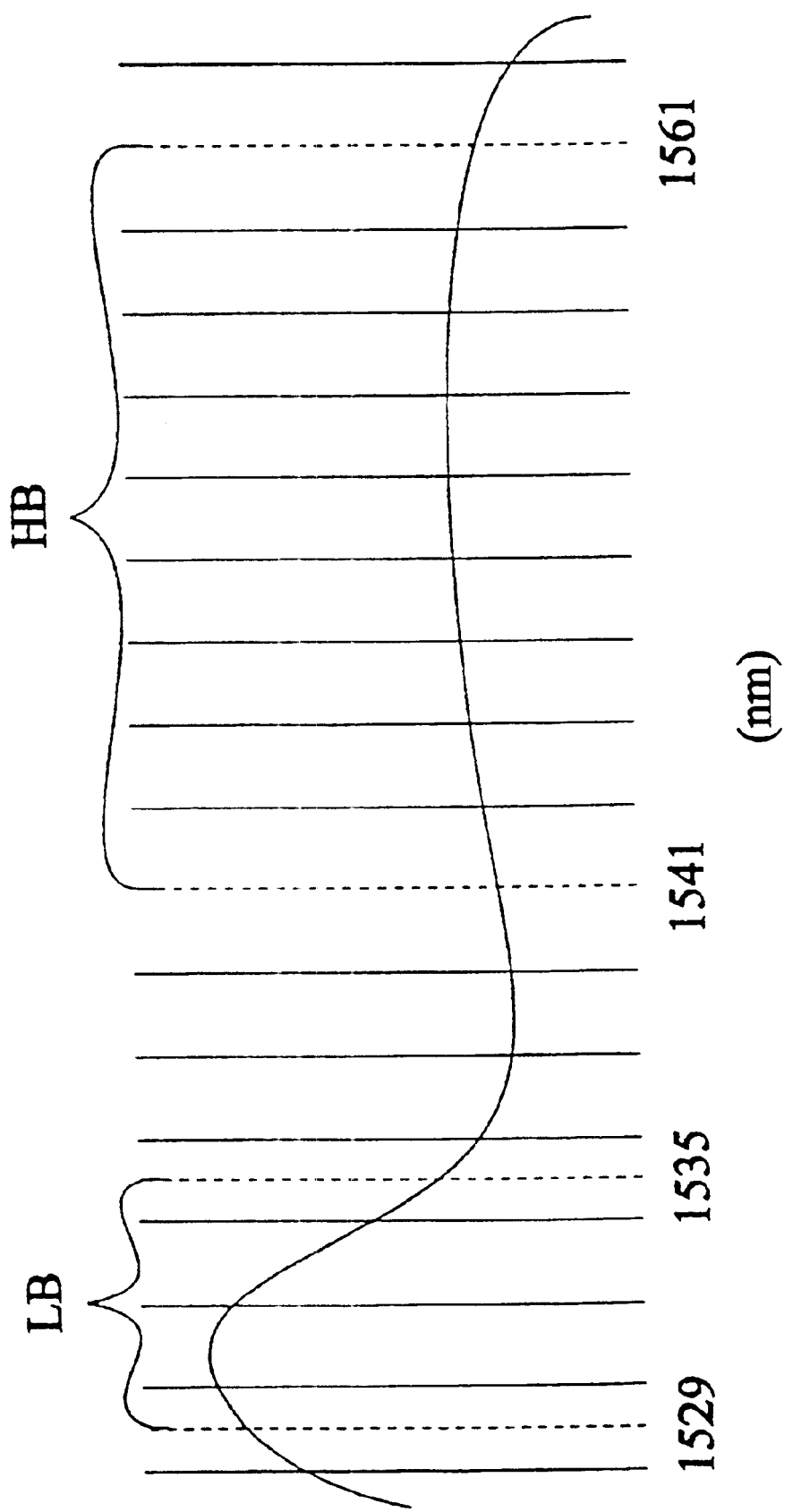
FIG. 3 is a graph of a gain characteristic for an erbium-doped fiber spectral emission range, as in FIG. 1, with a designation of a low band and a high band.

FIG. 3 is another graph of the erbium-doped fiber amplifier spectral emission range of 1528–1562 nm, which generally shows the different gain for channels of signals traveling through the erbium-doped fiber link. As shown in FIG. 3, the spectrum is divided in MUX 110 into two ranges that correspond to the low band (LB) and the high band (HB). In particular, the low band preferably covers the range between 1529 nm and 1535 nm, and the high band preferably covers the range between 1541 nm and 1561 nm. The gain characteristic in the high band is fairly flat, but the low band includes a substantial hump in the gain response. As explained below, to make use of the erbium-doped fiber spectral emission range in the low band, optical transmission system 100 uses equalizing means to flatten the gain characteristic in that range. As a result, by dividing the entire erbium-doped fiber spectral emission range of 1528–1562 nm into two sub-ranges that correspond to the low band and high band, optical transmission system 100 can effectively use most of the erbium-doped fiber spectral emission range and provide for dense WDM.

Figure 4:
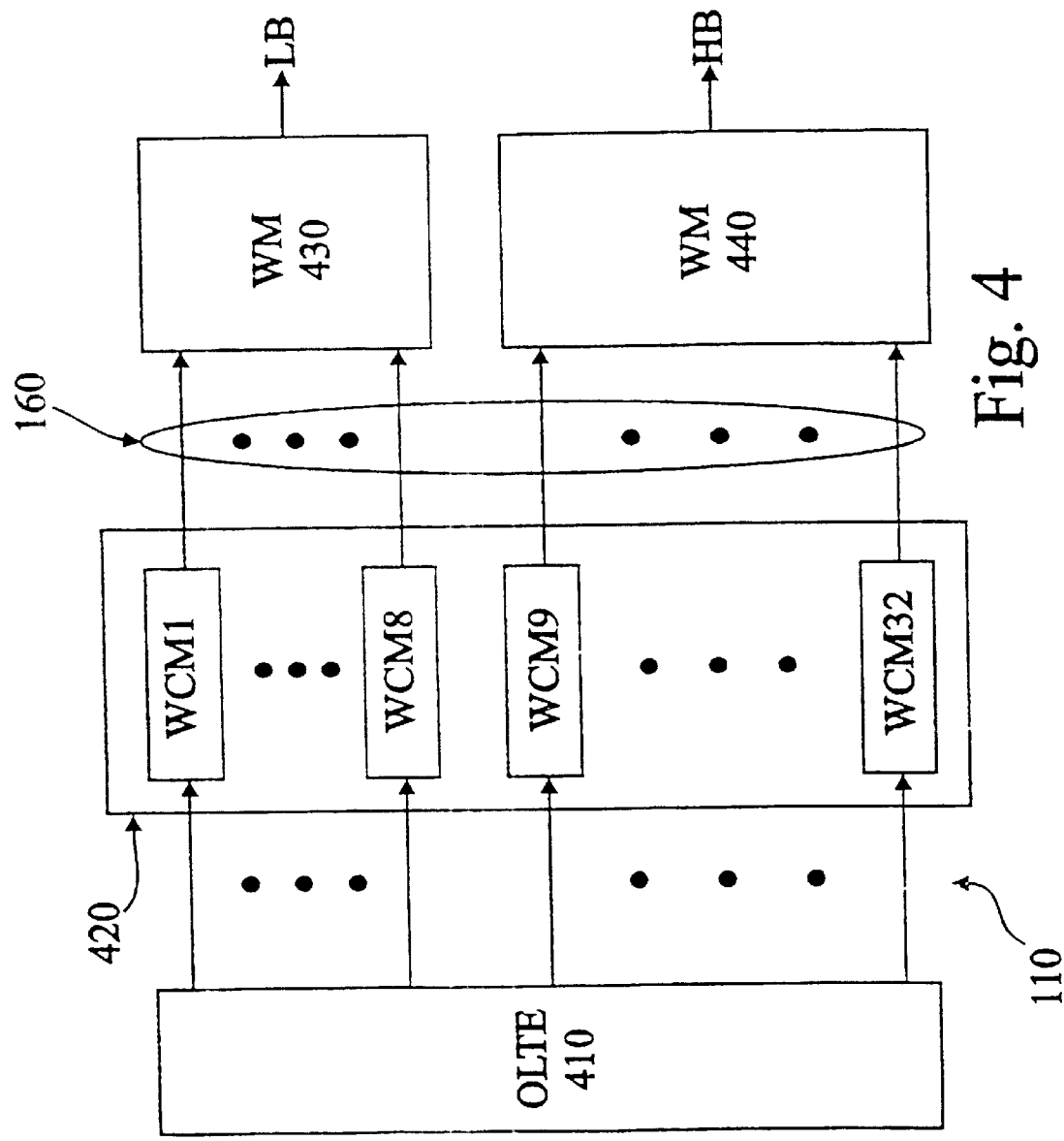
FIG. 4 is a more detailed diagram of the multiplexing section of the optical transmission system in FIG. 2.

The following provides a more detailed description of the various modules of the present invention depicted in FIG. 2. Referring to FIG. 4, a more detailed diagram of multiplexing section 110 of optical transmission system 100 illustrates optical line terminal section (OLTE) 410, a wavelength converter section (WCS) 420, and two wavelength multiplexers (WM) 430 and 440. OLTE 410, which may correspond to standard line terminating equipment for use in a SONET or SDH system, includes transmit/receive (TX/RX) units (not shown) in a quantity that equals the number of channels in WDM systems 100. In a preferred embodiment, OLTE 410 has thirty-two (32) TX/RX units. As readily understood to one of ordinary skill in the art, OLTE 410 may comprise a collection of smaller separate OLTEs, such as two, that feed information frequencies to WCS 420. Accordingly, WCS 420 includes thirty-two (32) wavelength converter modules WCM1–WCM32.

In multiplexing section 110, OLTE 410 transmits a plurality of signals at a generic wavelength. As shown in FIG. 4, for a preferred embodiment, OLTE 410 outputs a grouping of eight (8) signals and a grouping of twenty-four (24) signals. However, as indicated above, the number of signals may vary depending on the needs and requirements of the particular optical transmission system. Units WCM1–WCM8 each receive one of the grouping of eight signals emitted from OLTE 410, and units WCM9–WCM32 each receive one of the grouping of twenty-four signals emitted from OLTE 410. Each unit is able to convert a signal from a generic wavelength to a selected wavelength and re-transmit the signal. The units may receive and re-transmit a signal in a standard format, such as OC-48 or STM-16, but the preferred operation of WCM1–32 is transparent to the particular data format employed.

WCM1–32 preferably comprise a module having a photodiode (not shown) for receiving an optical signal from OLTE 410 and converting it to an electrical signal, a laser or optical source (not shown) for generating a fixed carrier wavelength, and an electro-optic modulator such as a Mach-Zehnder interferometer (not shown) for externally modulating the fixed carrier wavelength with the electrical signal. Alternatively, WCM1–32 may comprise a photodiode (not shown) together with a laser diode (not shown) that is directly modulated with the electrical signal to convert the received wavelength to the carrier wavelength of the laser diode. As a further alternative, WCM1–32 comprises a module having a high sensitivity receiver (e.g., according to SDH or SONET standards) for receiving an optical signal, e.g.; via a wavelength demultiplexer, from a trunk fiber line end and converting it to an electrical signal, and a direct modulation or external modulation laser source. By the latter alternative, regeneration of signals from the output of a trunk fiber line and transmission in the inventive optical communication system is made possible, which allows extending the total link length. WCM1–32 may be obtained, for example, from Applicants' assignee under the abbreviation TXT, WCM, or LEM.

The selected wavelength for each WCM within WCS 420 is preferably determined according to a standard grid, for example and not by way of limitation that shown in Table 1 below, such that each signal has a different wavelength. Each unit WCM1–WCM32 must be tuned and set to particular tolerances as is known in the art. Of course, the frequency separation of channels depends upon the system implementation chosen and may be, for example, 100 Ghz between each channel. Alternatively, the frequency spacing may be unequal to alleviate four-wave-mixing phenomenon.

The channel allocation shown in Table 1 below is designed for both a 2.5 Gb/s system and a 10 Gb/s system. In each of these two systems, band separation still occurs, but for different wavelengths depending on whether the system is using, for example, 8, 16, or 32 channels. Although FIG. 4 shows the signals are provided and generated by the combination of OLTE 410 and WCM1–WCM32, the signals can also be directly provided and generated by a source without limitation to their origin.

TABLE 1

Channel Allocation

| Nominal Channel | | System 2.5 Gb/s | | | | | | System 10 Gb/s |
|---|---|---|---|---|---|---|---|---|
| Thz | nm | 32(8 + 24) | 16(4 + 12) | 8(2 + 6) | 8(low) | 8(high) | 16(high) | 8(2 + 6) |
| 196 | 1529.55 | L | | | L | | | |
| 195.9 | 1530.33 | L | L | | L | | | |
| 195.8 | 1531.12 | L | | | L | | | |
| 195.7 | 1531.90 | L | L | L | L | | | L |
| 195.6 | 1532.68 | L | | | L | | | |
| 195.5 | 1533.47 | L | L | L | L | | | L |
| 195.4 | 1534.25 | L | | | L | | | |
| 195.3 | 1535.04 | L | L | | L | | | |
| 194.4 | 1542.14 | H | | | | | | |
| 194.3 | 1542.94 | H | H | | | | | |
| 194.2 | 1543.73 | H | | | | | | |
| 194.1 | 1544.53 | H | H | | | | | |
| 194 | 1545.32 | H | | | | | H | |
| 193.9 | 1546.12 | H | H | | | H | H | |
| 193.8 | 1546.92 | H | | | | | H | |

TABLE 1-continued

Channel Allocation

| Nominal Channel | | System 2.5 Gb/s | | | | | System 10 Gb/s |
|---|---|---|---|---|---|---|---|
| Thz | nm | 32(8 + 24) | 16(4 + 12) | 8(2 + 6) | 8(low) | 8(high) | 16(high) | 8(2 + 6) |

| Thz | nm | 32(8 + 24) | 16(4 + 12) | 8(2 + 6) | 8(low) | 8(high) | 16(high) | 8(2 + 6) |
|---|---|---|---|---|---|---|---|---|
| 193.7 | 1547.72 | H | H | H | | H | H | |
| 193.6 | 1548.51 | H | | | | | H | |
| 193.5 | 1549.32 | H | H | H | | H | H | H |
| 193.4 | 1550.12 | H | | | | | H | H |
| 193.3 | 1550.92 | H | H | H | | H | H | H |
| 193.2 | 1551.72 | H | | | | | H | H |
| 193.1 | 1552.52 | H | H | H | | H | H | H |
| 193 | 1553.33 | H | | | | | H | H |
| 192.9 | 1554.13 | H | H | H | | H | H | |
| 192.8 | 1554.94 | H | | | | | H | |
| 192.7 | 1555.75 | H | H | H | | H | H | |
| 192.6 | 1556.55 | H | | | | | H | |
| 192.5 | 1557.36 | H | H | | | H | H | |
| 192.4 | 1558.17 | H | | | | | | |
| 192.3 | 1558.98 | H | H | | | | | |
| 192.2 | 1559.79 | H | | | | | | |
| 192.1 | 1560.61 | H | H | | | | | |

Table 1 shows the nominal channel wavelengths output by the respective WCMs in WCS 420 for a WDM system 100 that uses up to thirty-two (32) channels. For a 2.5 Gb/s data rate, the third column lists the allocation between the low band and the high band for each of the thirty-two (32) channels generated by WCM1–32. The low band contains the first eight (8) channels, and the high band includes the next twenty-four (24) channels. Likewise, the fourth column shows the channel allocation for a sixteen (16) channel system with the four (4) channels designated at the low band and twelve (12) channels as the high band. As can be seen for the sixteen (16) channel allocation, and for the remaining preferred channel allocations in Table 1, the system implementations using less than thirty-two (32) channels have greater channel-to-channel spacing across the same overall bandwidth. As mentioned, the channel allocations in Table 1 illustrate a preferred selection for the channels within WDM system 100 and may be varied, both with respect to the individual channel wavelengths and the band for the channel wavelengths, as system requirements dictate. For example, if fiber amplifiers are used that have a rare-earth dopant other than erbium, or contain co-dopants in addition to erbium, the band of 1528–1562 nm may shift, spread, or shrink. Likewise, the actual fiber amplifiers employed may more efficiently support a different allocation of channels between high and low bands to that shown representationally in Table 1. As well, WDM system 100 may be revised or upgraded to accommodate, for example, sixty-four (64) channels with 50 GHz spacing at 2.5 Gb/s or sixteen (16) channels with 100 GHz spacing at 10 Gb/s.

For the preferred thirty-two (32) channel system, each selected wavelength signal output from units WCM1–WCM8 is received by WM 430, and each selected wavelength signal output from WCM9–WCM32 is received by WM 440. WM 430 and WM 440 combine the received signals of the two sub-bands, the low band and high band, respectively, into two wavelength division multiplexed signals. As shown in FIG. 4, WM 430 is an eight channel wavelength multiplexer, such as a conventional 1×8 planar optical splitter, and WM 440 is a twenty-four channel wavelength multiplexer, such as a conventional 1×32 planar optical splitter with eight unused ports. Each wavelength multiplexer may include a second port (e.g. 2×8 splitter and 2×32 splitter) for providing optical transmission system 100 with an optical monitoring channel (not shown). As well, WM 430 and 440 may have more inputs than is used by the system (e.g. 1×16 splitter and 1×64 splitter) to provide space for system growth. A wavelength multiplexer using passive silica-on-silicon ($SiO_2$—Si) or silica-on-silica ($SiO_2$—$SiO_2$) technology, for instance, can be made by one of ordinary skill in the art. Other technologies can also be used for WMs, e.g., for reducing insertion losses. Examples are AWG, gratings, and interferential filters.

The low band and high band output from multiplexing section 110 are received by TPA section 120. Naturally, the low band and high band signals may be provided to TPA section 120 from a source other than the OLTE 410, WCS 420, and WM 430 and 440 configuration depicted in FIG. 4. For example, the low band and high band signals may be generated and directly supplied to TPA section 120 by a customer without departing from the intent of the present invention described in more detail below.

Figure 5A:
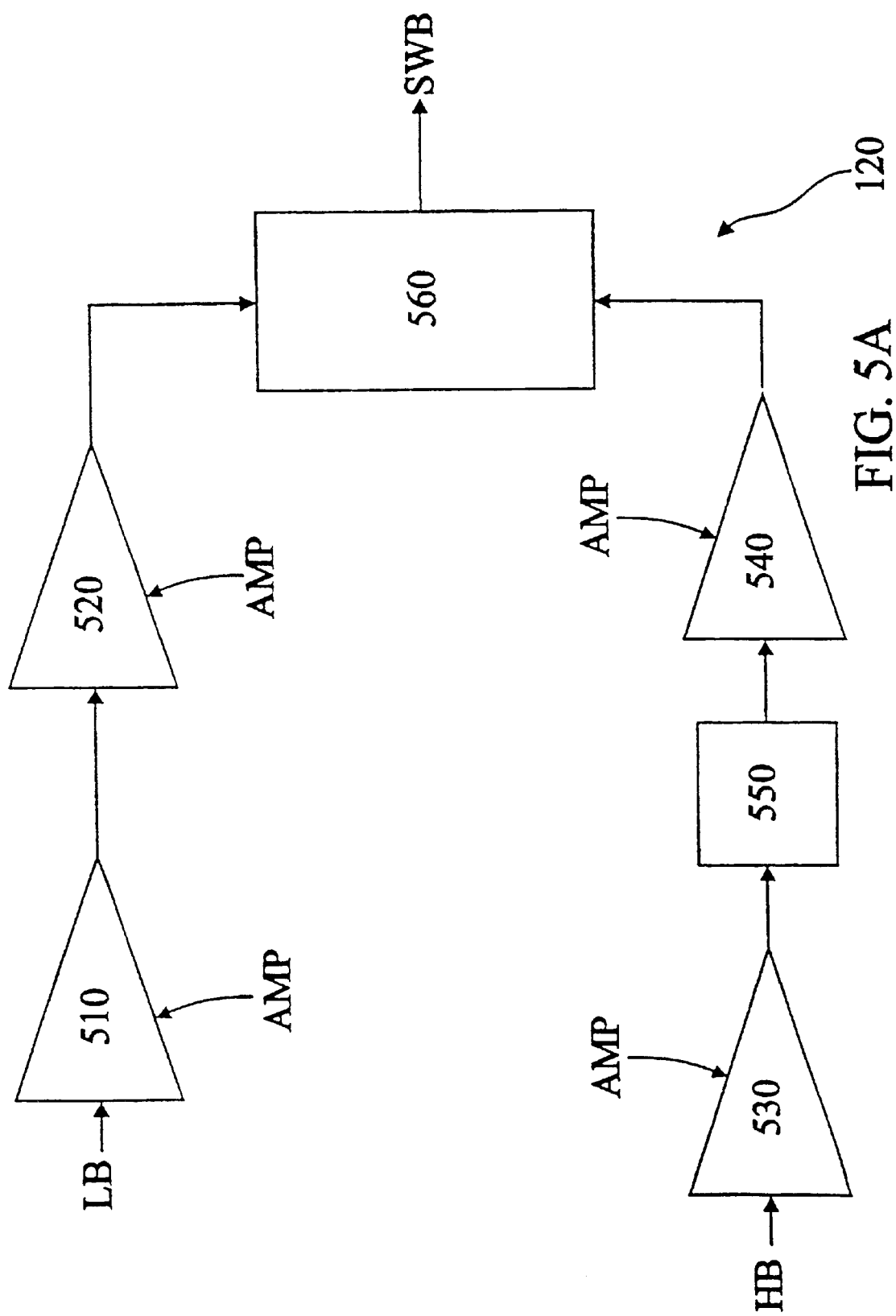
FIG. 5A is a more detailed diagram of the transmitter power amplifier section of the optical transmission system in FIG. 2.

As shown in FIG. 5A, TPA section 120 includes four amplifiers (AMP) 510, 520, 530, and 540, and filters 550 and 560. Amplifiers 510 and 520 are arranged in series and amplify the low band, and amplifier 530, filter 550, and amplifier 540 are also arranged in series and amplify the high band. The outputs of amplifiers 520 and 540 are received by filter 560, which combines the low band and the high band into a single wide-band (SWB).

Amplifiers 510, 520, 530, and 540 are preferably erbium-doped fiber amplifiers, although other rare-earth-doped fiber amplifiers may be used. Each of the amplifier 510, 520, 530, and 540 may be single-stage or multi-stage amplifiers as the particular design and system criteria warrant Each amplifier is pumped, for example, by a laser diode to provide optical gain to the signals it amplifies. The characteristics of each amplifier, including its length and pump wavelength, are selected to optimize the performance of that amplifier for the particular sub-band that it amplifies. For example, with the preferred erbium-doped fiber amplifiers, amplifiers 510 and 530 are pumped with a laser diode (not shown) operating at 980 nm to amplify the low band and high band, respectively, in a linear or in a saturated regime. Appropriate laser diodes are available from Applicants assignee. The laser diodes may be coupled to the optical path of the amplifiers 510 and 530 using 980/1550 WDM couplers (not shown) commonly available on the market, for example model SWDMO915SPR from E-TEK DYNAMICS, INC., 1885 Lundy Ave., San Jose, Calif. (USA). The 980 nm laser diode provides a low noise figure for the amplifiers compared with other possible pump wavelengths.

The outputs of amplifiers 510 and 530 are received by amplifiers 520 and 540, respectively. Amplifiers 520 and 540 preferably operate as booster amplifiers in a saturated condition. Amplifier 520 amplifies the low band with another 980 nm pump (not shown) coupled to the optical path of the low band using a WDM (not shown) described above. The 980 nm pump provides better gain behavior and noise figure for signals in the low band region that covers 1529–35 nm. Amplifier 540 amplifies the high band preferably with a laser diode pump source operating at 1480 nm. Such a laser diode is available on the market, such as model FOL1402PAX-1 supplied by JDS FITEL, INC., 570 Heston Drive, Nepean, Ontario (CA). The 1480 nm pump provides better saturated conversion efficiency behavior, which is needed in the high band for the greater number of channels in the region that covers 1542–61 nm. Alternatively, a higher power 980 nm pump laser or multiplexed 980 nm pump sources may be used.

Figure 5B:
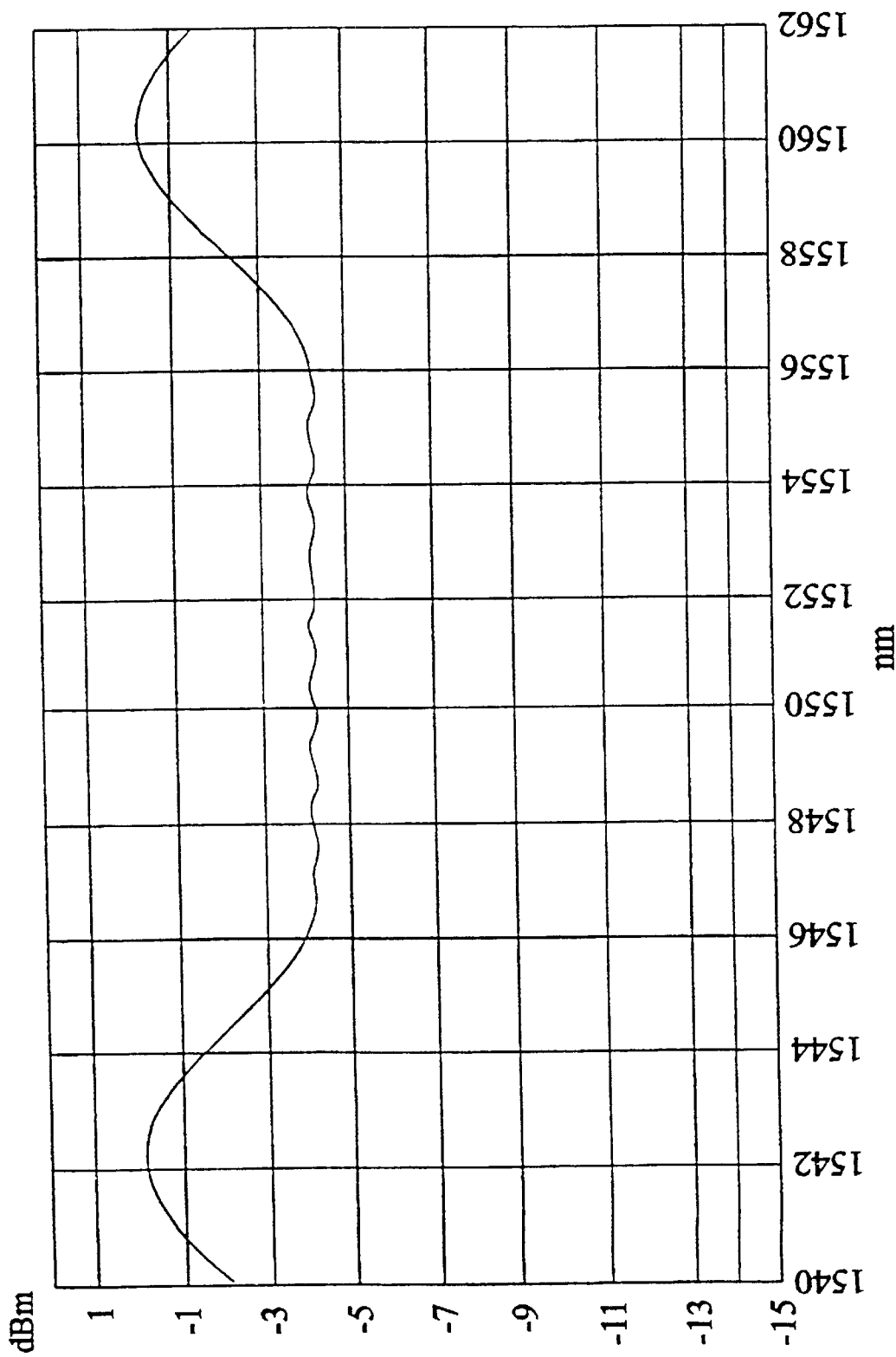
FIG. 5B is a graph of a filter performance shape of a de-emphasis filter for the transmitter power amplifier of the present invention.

As shown in FIG. 5A, TPA section 120 may include filter 550 within the high band amplifier chain for helping to equalize signal levels and SNRs at the system output across the high band. In the preferred embodiment, filter 550 is positioned between the two amplifier stages formed by AMP 530 and AMP 540 and comprises a de-emphasis filter that attenuates the wavelength regions of the high amplification within the high band. The de-emphasis filter, if used, may employ long period Bragg grating technology, split-beam Fourier filter, etc. As an example, the de-emphasis filter may have an operating wavelength range of 1541–1561 nm and have wavelengths of peak transmission at 1541–1542 nm and 1559–1560 nm, with a lower, relatively constant transmission for the wavelengths between these peaks. FIG. 5B illustrates the filter shape or relative attenuation performance of a preferred de-emphasis filter 550. The graph of FIG. 5B shows that de-emphasis filter 550 has regions of peak transmission at around 1542 nm and 1560 nm, and a region of relatively constant or flat attenuation between about 1547 nm and 1556 nm. The de-emphasis filter 550 for erbium-doped fiber amplifiers need only have add an attenuation of about 3–4 dB at wavelengths between the peaks to help flatten the gain response across the high band. De-emphasis filter 550 may have an attenuation characteristic different from that depicted in FIG. 5B depending on the gain-flattening requirements of the actual system employed, such as the dopant used in the fiber amplifiers or the wavelength of the pump source for those amplifiers. As well, de-emphasis filter 550 may be positioned along the path of the high band at a location other than between AMP 530 and AMP 540 as desired.

After passing through the amplifiers of TPA 120, the amplified low band and high band output from amplifiers 520 and 540, respectively, are received by filter 560. Filter 560 may be, for example, an interferential low pass three-port filter, which combines the low band and high band into the single wide-band and outputs it from one common port. Thus, filter 560 acts as a band combining filter. An optical monitor (not shown) and insertion for a service line, at a wavelength different from the communication channels, e.g. at 1480 nm, through a WDM 1480/1550 interferential filter (not shown) may also be added at the common port. The optical monitor detects optical signals to ensure that there is no break in optical transmission system 100. The service line insertion provides access for a line service module, which can manage through an optical supervisory channel the telemetry of alarms, surveillance, monitoring of performance and data, controls and housekeeping alarms, and voice frequency orderwire.

Figure 6:
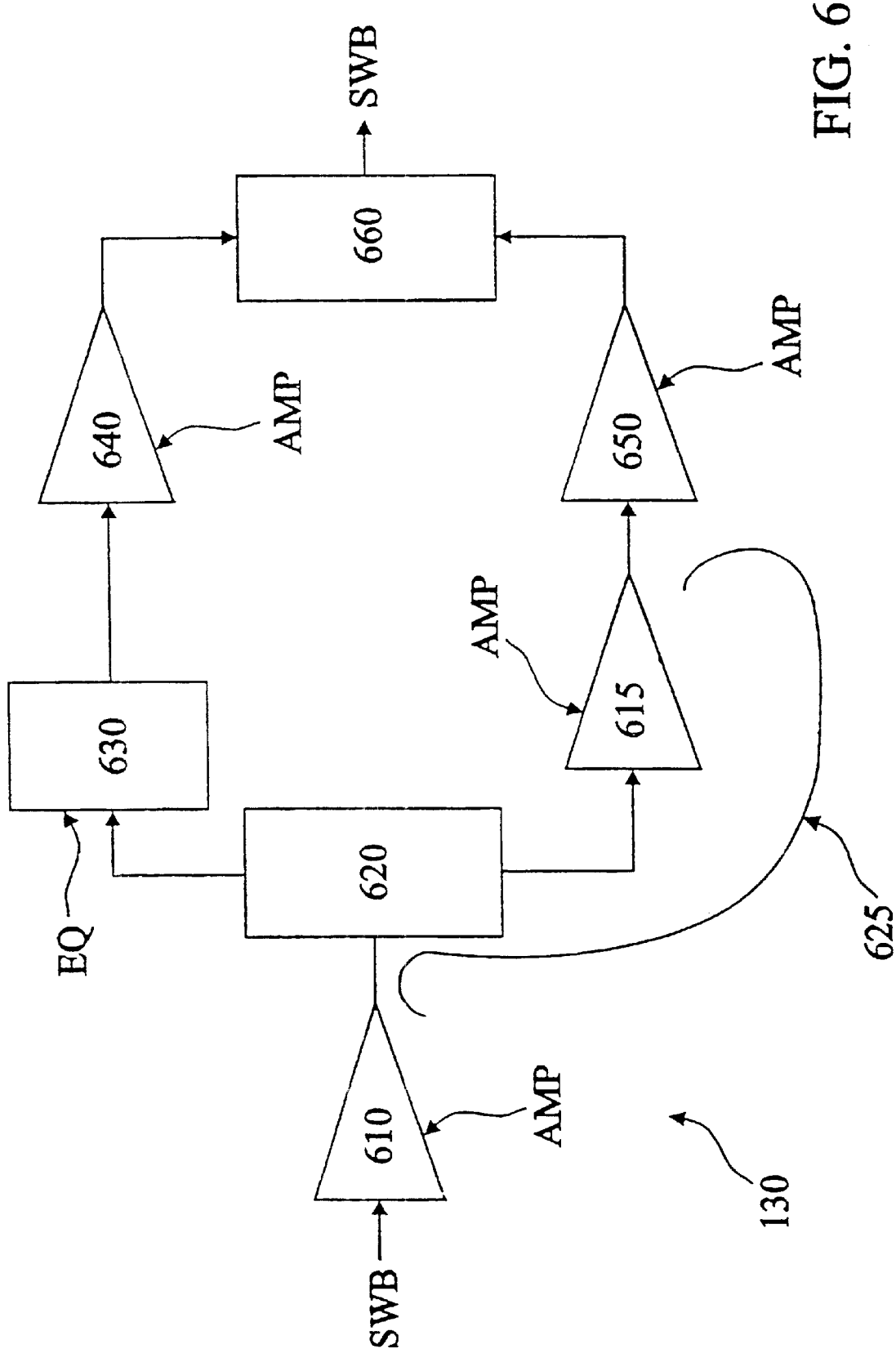
FIG. 6 is a more detailed diagram of the optical line amplifier section of the optical transmission system in FIG. 2.

The single wide-band output from filter 560 of TPA section 120 passes through a length of transmission fiber (not shown), such as 100 kilometers, which attenuates the signals within the single wide-band. Consequently, OLA section 130 is used to receive and amplify the signals within the single wide-band. As shown in FIG. 6. OLA section 130 includes several amplifiers (AMP) 610, 615, 640, and 650, two filters 620 and 660, and an equalizing filter (EQ) 630. Amplifier 610 receives and amplifies the single wide-band, which is then separated back into the low band and high band by filter 620. The low band is equalized by equalizing filter 630 and amplified by amplifier 640, whereas the high band, which has already passed through de-emphasis filter 550 in TPA 120, is only amplified by amplifiers 615 and 650. The amplified low band and high band are then recombined into the single wide-band by filter 660.

Amplifier 610, which receives the single wide-band, preferably comprises a single optical fiber amplifier that is operated in a linear regime. That is, amplifier 610 is operated in a condition where its output power is dependent on its input power. Depending on the actual implementation, amplifier 610 may alternatively be a multi-stage amplifier. Applicants have found that by operating it in a linear condition, amplifier 610 helps to ensure relative power independence between the high band channels and the low band channels. In other words, with amplifier 610 operating in a linear condition, the output power (and signal-to-noise ratio) of individual channels in the one of the two sub-bands does not vary significantly if channels in the other sub-band are added or removed during operation of WDM system 100.

Consequently, the system of the present invention provides increased flexibility in its application. More specifically, to obtain robustness with respect to the presence of some or all of the channels in a dense WDM system, the system consistent with the present invention should operate with a first stage amplifier, such as amplifier 610, in an unsaturated regime in a line amplifying unit 130 before extracting a portion of the channels for separate equalization and amplification. In a preferred embodiment, amplifier 610 is an erbium-doped fiber amplifier that is pumped in a co-propagating direction with a laser diode (not shown) operating at 980 nm pump to obtain a noise figure preferably less than 5.5 dB for both the low band and high band.

Following amplifier 610, filter 620 receives the output from amplifier (AMP) 610 and splits the single wide-band into the low band and the high band components. Filter 620 may comprise, for example, a three-port device having a drop port that feeds the low band into equalizing filter 630 and a reflection port that feeds the high band into amplifier 650 in FIG. 6. In this configuration, the filter 620 is preferably an interferential filter that passes or drops the low band to equalizing filter 630 with a high isolation of the high-wavelength part of the spectrum, and reflects the high band to amplifier 650 with a low isolation of the low-wavelength part of the spectrum. In particular, filter 620 preferably has a minimum isolation in the drop path for 1528 nm to 1536.5 nm of 25 dB and a minimum isolation in the reflection path for 1540.5 nm to 1565 nm of 10 dB. Also, the preferred filter has a maximum insertion loss in the reflection path for 1528 to 1536.5 nm of 0.7 dB and in the drop path for 1540.5 nm to 1565 nm of 1.5 dB. Other specifications for filter 620, of course, will depend on the particular channel wavelengths and amplifiers chosen for the WDM system 100.

The high band, which is separated from the single wideband, passes from filter 620 to amplifier (AMP) 615. Amplifier 615 is preferably a single erbium-doped fiber amplifier that is operated in saturation, such that its output power is substantially independent from its input power. In this way, amplifier 615 serves to add a power boost to the channels in the high band compared with the channels in the low band. Due to the greater number of channels in the high band compared with the low band in the preferred embodiment, i.e. twenty-four channels as opposed to eight, the high band channels typically will have had a lower gain when passing through the amplifiers for the single wide-band, such as amplifier 610. As a result, amplifier 615 helps to balance the power for the channels in the high band compared with the low band. Of course, for other arrangements of channels between the high and low bands, amplifier 615 may not be required or may alternatively be required on the low band side of OLA section 130.

With respect to the high band of channels, amplifiers 610 and 615 may be viewed together as a two-stage amplifier with the first stage operated in a linear mode and the second stage operated in saturation. Relative stabilization of the output power between channels in the low band is generally not needed if, as in the presently described embodiment, the number of channels in the low band is limited to eight. This may change for systems having a higher number of channels in the low band. To help stabilize the output power between channels in the high bands, amplifier 610 and 615 are preferably pumped with the same laser diode pump source. In this manner, as described in EP695049, the residual pump power from amplifier 610 is provided to amplifier 615. Specifically, OLA section 130 includes a WDM coupler (not shown) positioned between amplifier 610 and filter 620 that extracts 980 nm pump light that remains at the output of amplifier 610. This WDM coupler may be, for example, model number SWDMCPR3PS110 supplied by E-TEK DYNAMICS, INC., 1885 Lundy Ave., San Jose, Calif. (USA). The output from this WDM coupler feeds into a second WDM coupler (not shown) of the same type and positioned in the optical path after amplifier 615. The two couplers are joined by an optical fiber 625 that transmits the residual 980 nm pump signal with relatively low loss. The second WDM coupler passes the residual 980 nm pump power into amplifier 615 in a counter-propagating direction.

The high band output from booster amplifier 615 then passes through affiliated isolators (not shown) and monitoring splitters (not shown) before entering rare-earth doped fiber amplifier 650. For the preferred erbium-doped fiber amplifier, amplifier 650 has a pump wavelength of, for example, 1480 nm from a laser diode source (not shown) having a pump power in excess of the laser (not shown) that drives amplifiers 610 and 615. The 1480 nm wavelength provides good conversion efficiency for high output power output compared with other pump wavelengths for erbium-doped fibers. Alternatively, a high power 980 nm pump source or a group of multiplexed 980 nm pump sources could be used to drive amplifier 650. The amplifier 650 preferably operates in saturation to provide the power boost to the signals within the high band, and if desired, may comprise a multi-stage amplifier.

After passing through amplifier 610 and filter 620, the low band enters equalizing filter 630. As discussed above, the gain characteristic for the erbium-doped fiber spectral emission range has a peak or hump in the low band region, but remains fairly flat in the high band region. As a result, when the low band or the single wide-band, which includes the low band, is amplified by an erbium-doped fiber amplifier, the channels in the low band region are amplified unequally. Also, as discussed above, when equalizing means have been applied to overcome this problem of unequal amplification, the equalizing has been applied across the entire spectrum of channels, resulting in continued gain disparities. However, by splitting the spectrum of channels into a low band and a high band, equalization in the reduced operating area of the low band can provide proper flattening of the gain characteristic for the channels of the low band.

Figure 7A:
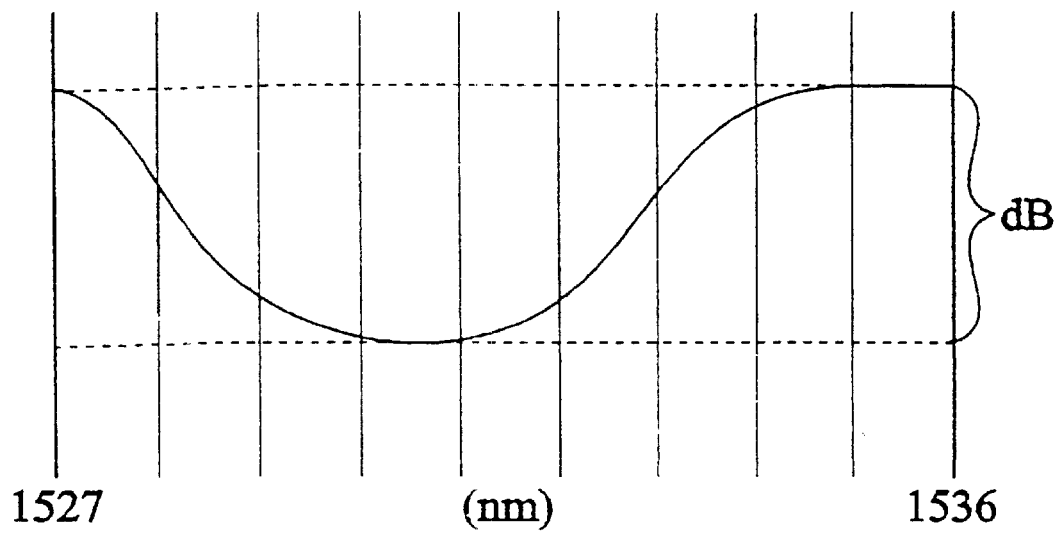
FIGS. 7A and 7B are graphs of an insertion loss characteristic of an equalizing filter and the corresponding gain characteristic for an erbium-doped fiber amplifier, respectively.
Figure 7B:
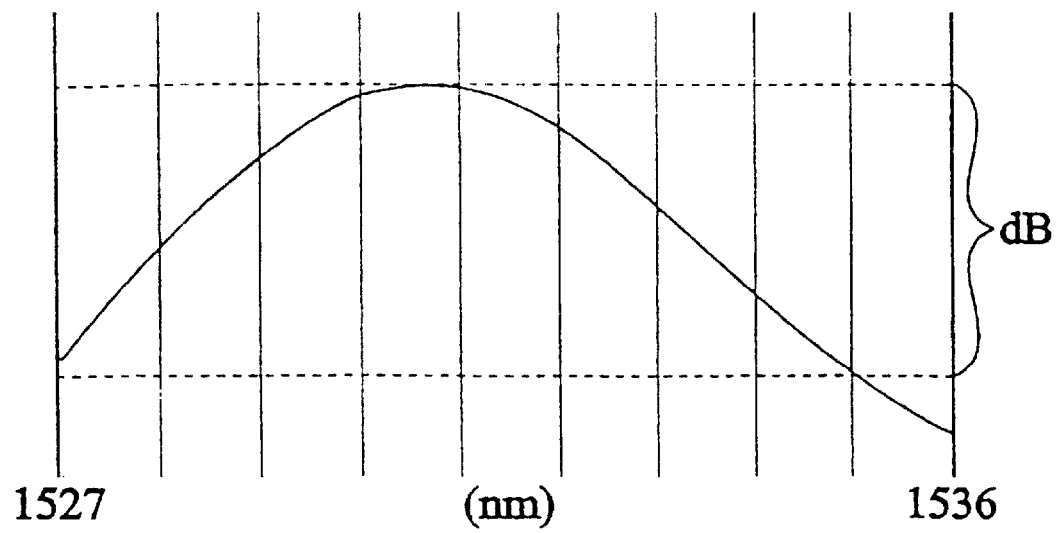

FIGS. 7A and 7B show a graph of the idealized filter shape for the low band region in equalizing filter 630 and an erbium-doped fiber amplifier gain spectrum with a 980 nm pump, respectively. As shown in FIGS. 7A and 7B, the idealized filter shape for equalizing filter 630 and the amplifier gain spectrum are almost exact inverted responses of each other, and in particular, the peak of the gain characteristic of the amplifier closely corresponds to the bottom of the valley of the filter shape of equalizing filter 630. As a result, the application of equalizing filter 630 to the low band effectively flattens the gain response for the channels in the low band.

In a preferred embodiment, the equalizing filter 630 comprises a two-port device based on long period chirped Bragg grating technology that gives selected attenuations at different wavelengths. For instance, equalizing filter 630 for the low band may have an operating wavelength range of 1529 nm to 1536 nm, with a wavelength at the bottom of the valley at between 1530.3 nm and 1530.7 nm. Equalizing filter 630 need not be used alone and may be combined in cascade with other filters (not shown) to provide an optimal filter shape, and thus, gain equalization for the particular amplifiers used in the WDM system 100. Equalizing filter 630 may be manufactured by one skilled in the art, or may be obtained from numerous suppliers in the field. It is to be understood that the particular structure used for the equalizing filter 630 is within the realm of the skilled artisan and may include, for instance, a specialized Bragg grating like a long period grating, an interferential filter, or Mach-Zehnder type optical filters, as long as the employed structure provides the desired filtering response such as that shown in FIG. 7A.

After passing through equalizing filter 630, the low band passes through another rare-earth-doped fiber amplifier 640. With the preferred erbium-doped fiber amplifier, amplifier 640 has a pump wavelength of 980 nm, provided by a laser diode source (not shown) and coupled via a WDM coupler (not shown) to the optical path for pumping the amplifier 640 in a counter-propagating direction. Since the channels in the low band pass through both amplifier 610 and amplifier 640, equalizing filter 630 may compensate for the gain disparities caused by both amplifiers. Thus, the decibel drop for equalizing filter 630 should be determined according to the overall amplification and line power requirements for the low band. The amplifier 640 preferably operates in saturation to provide a power boost to the signals in the low band, and may comprise a multi-stage amplifier if desired.

Figure 8A:
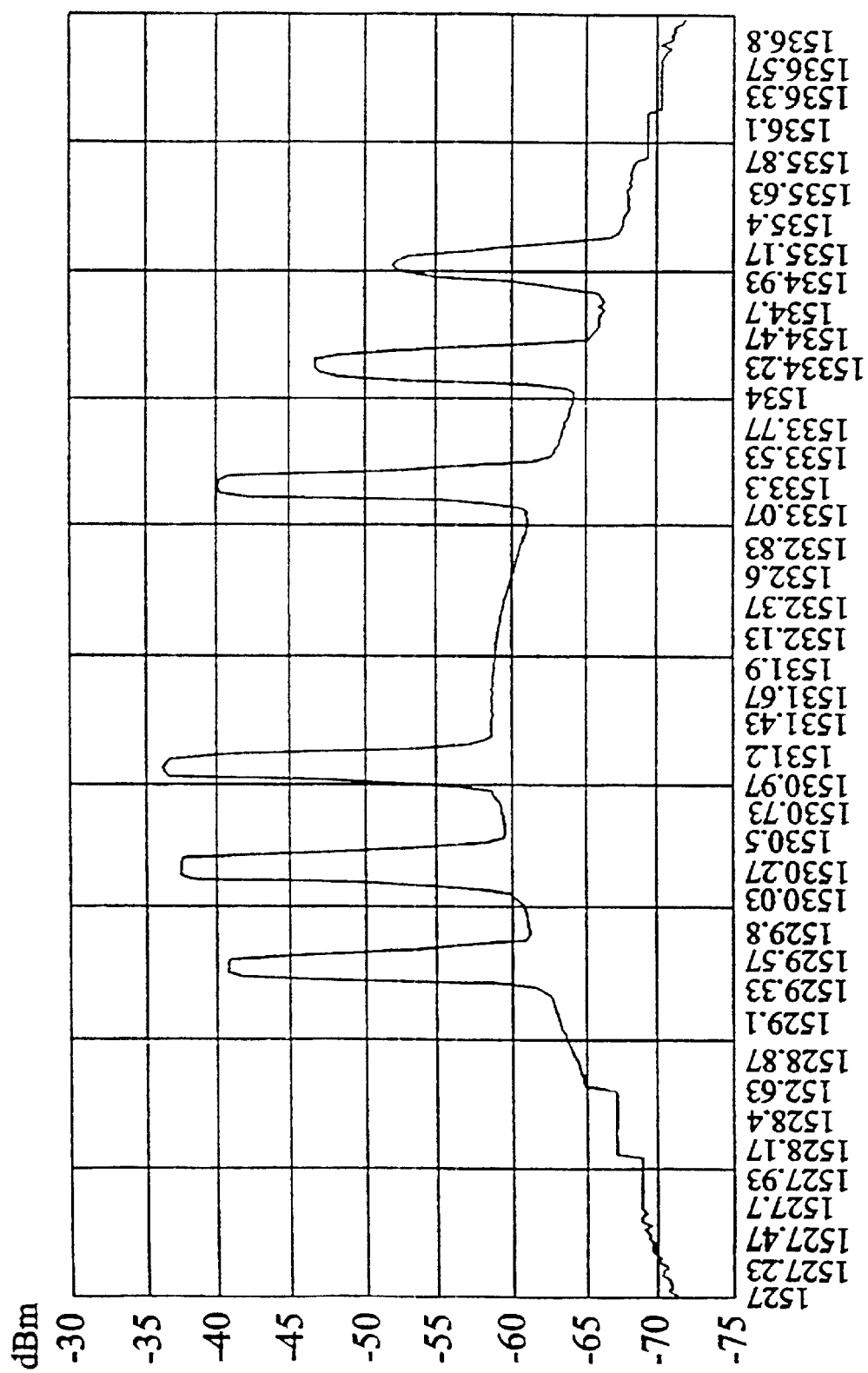
FIG. 8A is a graph of an experimental output of an optical transmission system consistent with the present invention with six channels in a low band.
Figure 8B:
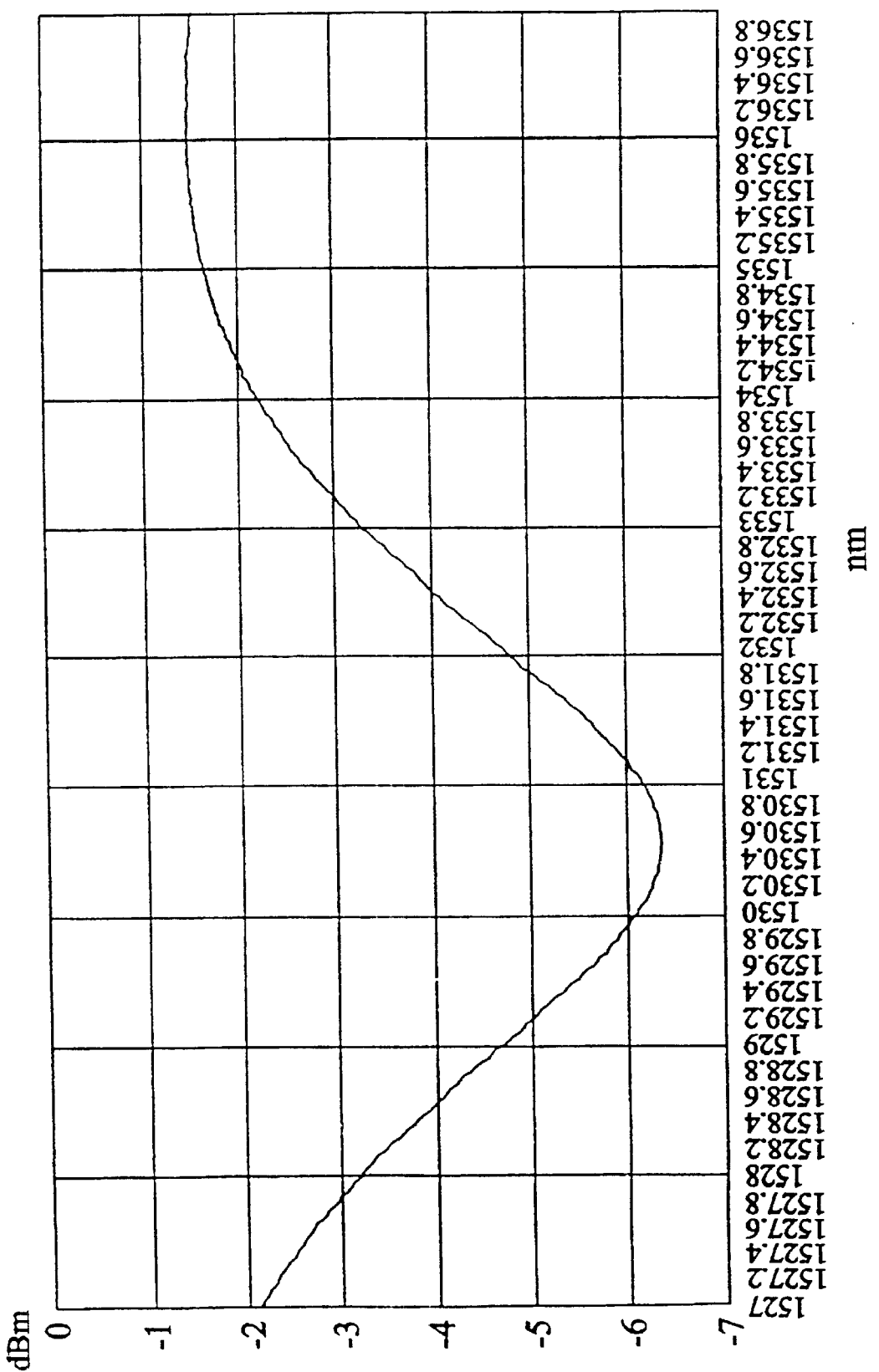
FIG. 8B is a graph of an experimental filter performance shape of an equalizing filter using long period Bragg grating technology.
Figure 8C:
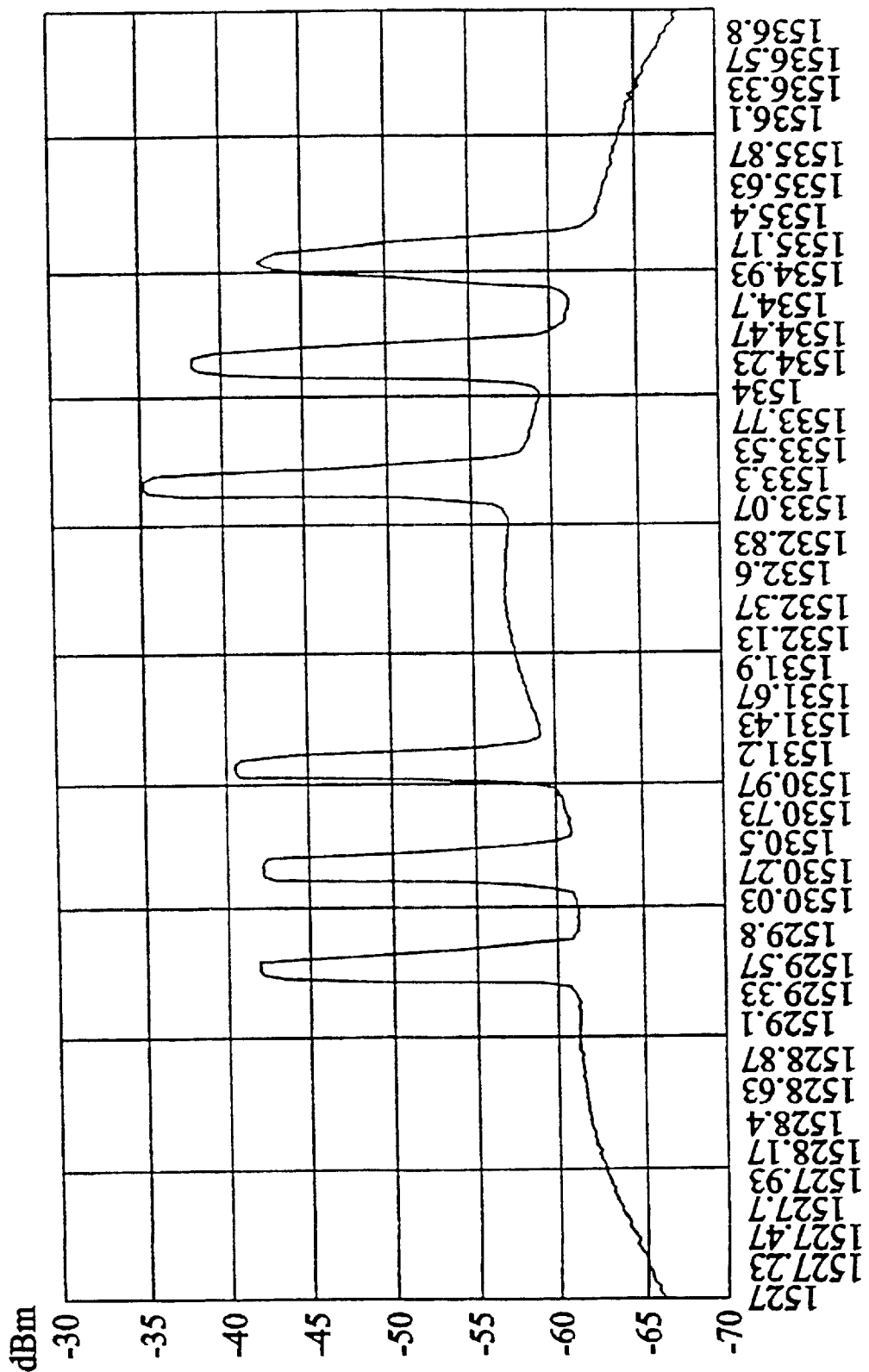
FIG. 8C is a graph of an experimental output of the optical transmission system with six channels in the low band of FIG. 8A, with the equalizing filter with the filter shape of FIG. 8B coupled in the low band second stage of the line amplifiers in the system.

FIG. 8A illustrates an experimental result of the output from a WDM system with a TPA, four (4) OLAs, a TPA and connecting fibers with six (6) channels in the low band without the use of equalizing filter 630 in OLAs. The graph in FIG. 8A shows how the hump in the low band region of the erbium-doped fiber amplifier affects the output power of each of the channels across that sub-band. The vertical axis of the graph shows a relative monitor output power in dB having 5 dB per division, and the horizontal axis of the graph shows wavelength in units of nanometers. For example, the channels show a difference in output power of up to about 15 dB and a signal-to-noise ratio (on a 0.2 nm bandwidth) that ranged from about 22 dB to about 14 dB. FIG. 8B shows the filtering response shape of an equalizing filter 630 used for the low band in the system test of FIG. 8A. As shown, the equalizing filter 630 used had a minimum passband at around 1530 nm and a maximum at around 1536 nm. FIG. 8C depicts the results obtained when combining the equalizing filter 630 having the performance of FIG. 8B with the six channels of FIG. 8A. The use of the equalizing filter 630 results in a more equal output power and optical signal to noise ratios for each of the channels within the low band. Specifically, FIG. 8C shows that the six tested channels had a difference in output power of up to about 8 dB and a signal-to-noise ratio that ranged from about 24 dB to about 20 dB (on a 0.2 nm bandwidth).

Figure 8D:
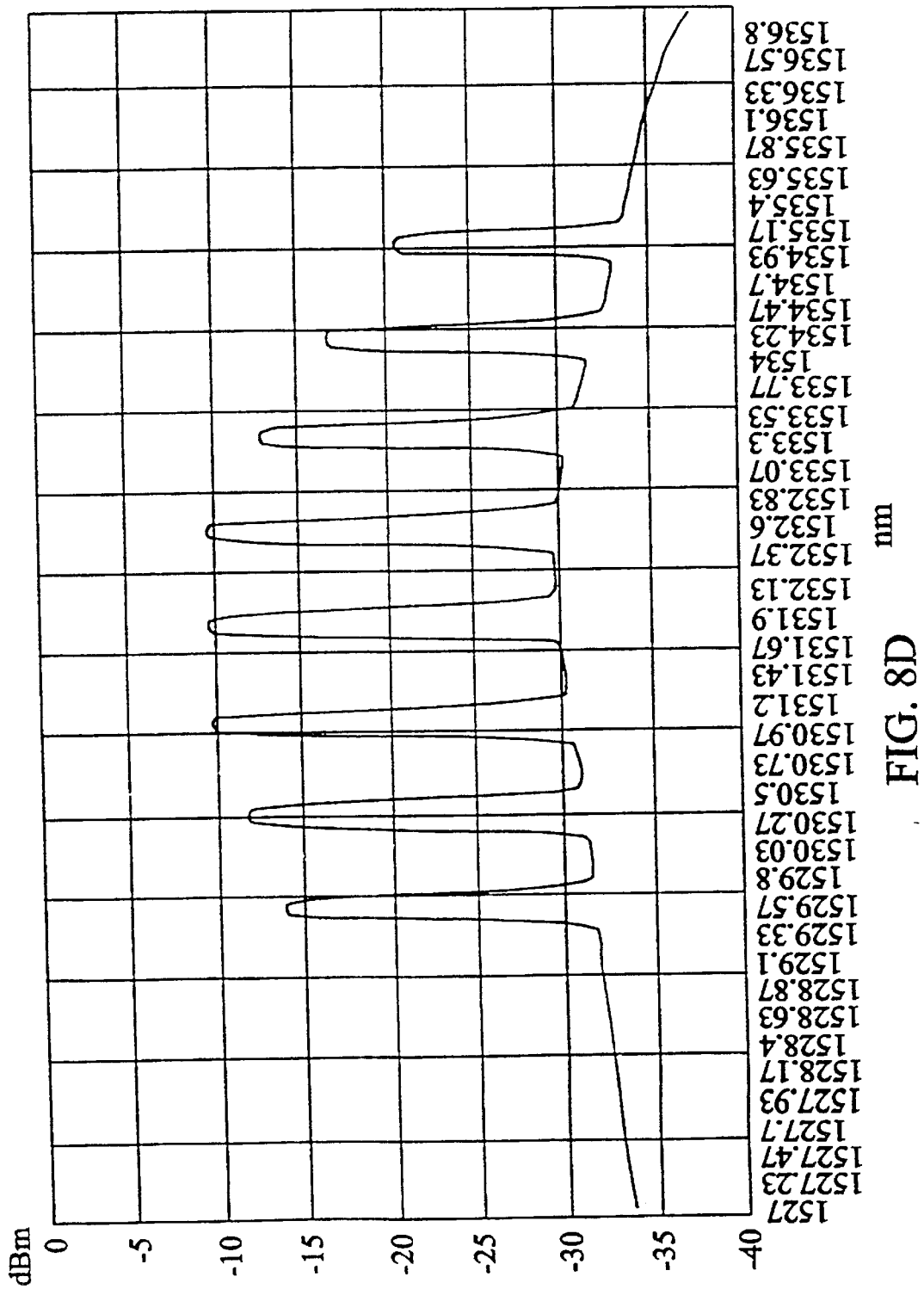
FIG. 8D is a graph of an experimental output of the optical transmission system of FIG. 8A with eight channels in a low band.
Figure 8E:
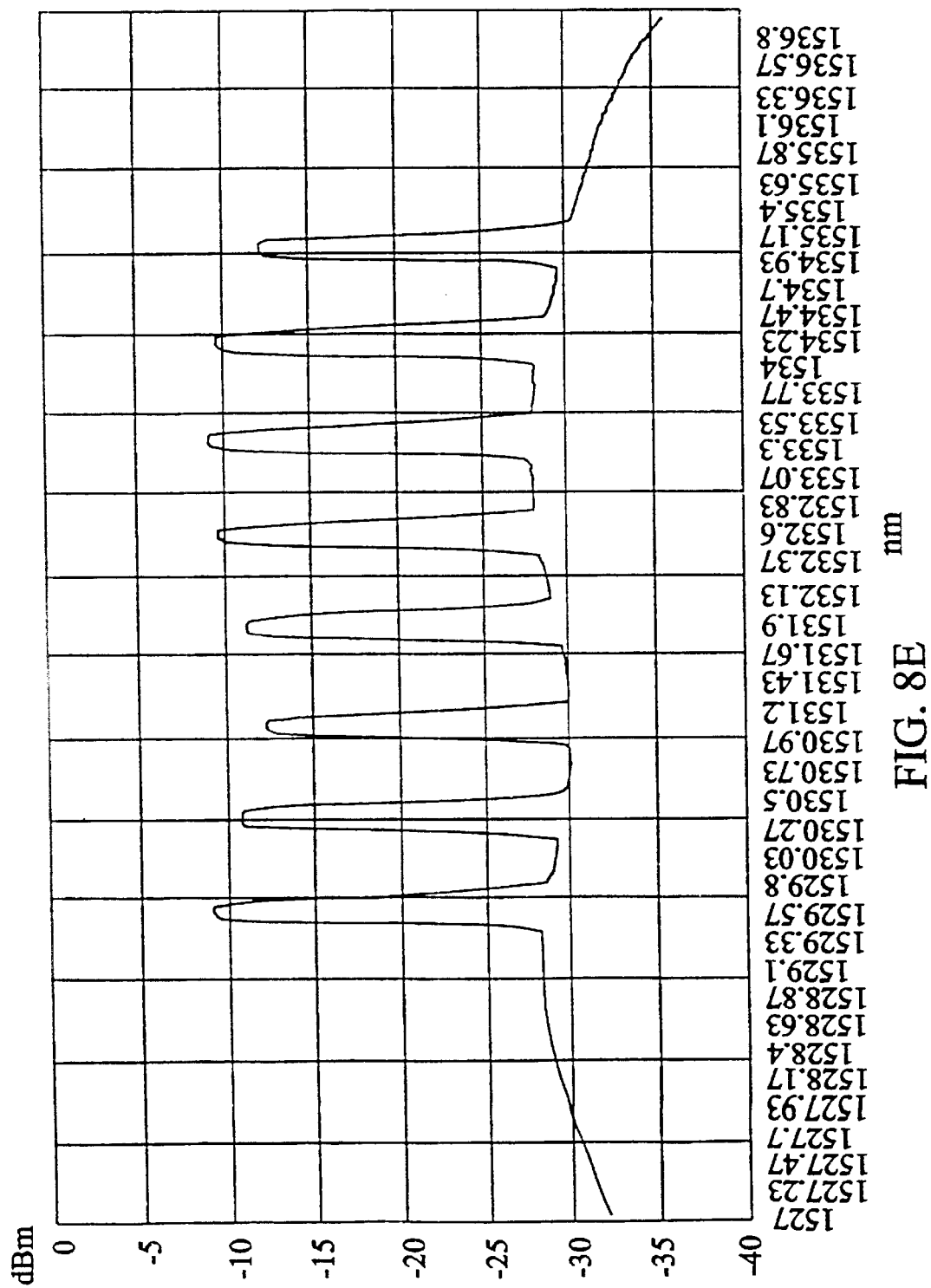
FIG. 8E is a graph of an experimental output of the optical transmission system of FIG. 8D with eight channels in the low band of FIG. 8D, with the equalizing filter with the filter shape of FIG. 8B coupled in the low band second stage of the line amplifiers in the system.

FIGS. 8D and 8E illustrate experimental results at the output of a WDM system with a TPA, four (4) OLAs, a TPA and connecting fibers with eight (8) channels in the low band without the use of equalizing filter 630 in OLAs. FIG. 8D shows the output response without the use of equalizing filter 630. The vertical axis of the graph shows a relative monitor output power in dB having 5 dB per division, and the horizontal axis of the graph shows wavelength in units of nanometers. As shown, the output power from amplifier 640 for the test varied from channel-to-channel by up to about 11 dB, while the signal-to-noise ratio (on a 0.2 nm bandwidth) fluctuated from about 13 dB to about 21 dB. In FIG. 8E, the output for the eight channels of FIG. 8D are illustrated graphically for a test when the equalizing filter 630 of FIG. 8B was used in the low band optical path. According to FIG. 8E, with equalizing filter 630, the output power of the channels shifted by up to about only 4 dB, while the signal-to-noise ratio varied from about 18 dB to about 20 dB.

After passing through amplifiers 640 and 650 respectively, the amplified low band and amplified high band are then recombined by filter 660 into the single wide-band. Like filter 620, filter 660 may also be a low-pass three-port interferential filter. In addition, it is preferred to use filter 620 as a reflector for the low band and as a transmitter for the high band (i.e. high pass filter) and filter 660 in reverse (i.e. low pass filter) in order to achieve both negligible crosstalk between the bands and optimized output insertion losses for the high band. Like TPA section 120, OLA section 130 may also include an optical monitor and a service line insertion and extraction (not shown) through, e.g., a WDM 1480/1550 interferential filter (not shown). One or more of these elements may be included at any of the interconnection points of OLA section 130.

In addition, OLA section 130 may include several other optical modules not shown for optimizing the performance of WDM system 100. For instance, the OLA section 130 may include an optical add/drop module (OADM) (not shown) for adding and/or dropping channels from the WDM transmission path. In a preferred embodiment, an OADM is situated between the output of the second stage amplifier 615 and booster amplifier 650 for dropping or inserting channels within the high wavelength band. Another OADM may be situated between equalization filter 630 and booster amplifier 640 for dropping or inserting channels within the low wavelength band. Also, the OLA section 130 may include a dispersion compensating module (DCM) (not shown) for compensating for chromatic dispersion that may arise during transmission of the signals along the long-distance communication link. The DCM may be incorporated into the OADM or at least positioned at the same location as the OADM within the high and low band portions of the OLA section 130.

In a preferred arrangement, the OADM includes four-port optical circulators, together with gratings and/or interferential filters to direct selected wavelengths. The channels within a particular multiplexed signal, such as the high band of channels exiting amplifier 615, would enter a first port of the optical circulator and rotate to the next port of the circulator. A series of Bragg gratings have reflection wavelengths corresponding to the channels to be dropped would be coupled to the second port of the circulator. The third and fourth ports of the circulator would include additional Bragg gratings to further direct the channels to be dropped to the appropriate port. Interferential filters, or the like, may be attached to the outputs of the third and fourth circulator ports to further separate and direct the individual dropped channels. Channels other than those to be dropped will pass through the Bragg gratings coupled to the second circulator port and continue in the WDM system 100.

In the OADM described above, the output from the second port of the first optical circulator may feed into a first port of a second optical circulator. Channels to be added to the WDM system, which should correspond with the channels that are dropped, may be inserted to third or fourth ports of the second optical circulator. When inserted into these ports, the inserted channels will rotate around the circulator, exit at the first circulator port, be reflected by the Bragg gratings positioned at that first port, and join the other channels from the first circulator port in reentering the first port of the second circulator. These combined channels will then rotate around the second circulator to the second port and exit for continued transmission along the WDM system.

Other arrangements for adding and dropping channels for use with the present invention are also acceptable. For instance, an arrangement using a non-rotating optical device, such as an optical splitter, may be used together with a series of Bragg gratings attached to each of two outputs from the splitter. The gratings on the first output of the splitter have reflection bands equal to the channels to be dropped and added, while the gratings on the second output of the splitter have reflection bands equal to the channels that will not be dropped and added. A group of interferential filters connected to the output of the gratings on the second splitter output will separate the dropped channels. A second splitter attached to the output of the gratings on the first splitter output will insert channels having new information to the system. Other arrangements for the OADM will be apparent to those of ordinary skill in the art.

The DCM (not shown) may also have several forms. For example, the DCM may have an optical circulator with a first port connected to receive the channels in either the high band or the low band. A chirped Bragg grating may be attached to a second port of the circulator. The channels will exit the second port and be reflected in the chirped Bragg grating to compensate for chromatic dispersion. The dispersion compensated signals will then exit a next port of the circulator for continued transmission in the WDM system. Other devices besides the chirped Bragg grating, such as a length of dispersion compensating fiber, may be used for compensating the chromatic dispersion. The design and use of the OADM and DCM sections are not restrictive to the present invention and may employed or omitted in the WDM system 100 depending on overall requirements for system implementation.

After the OLA section 130, the combined single wideband passes through a length of long-distance optical transmission fiber. If the length is sufficiently long to cause attenuation of the optical signals, i.e. 100 kilometers or more, an additional OLA section may be used. In a preferred arrangement, five spans of long-distance transmission fiber are used and separated by four OLA sections.

Figure 9:
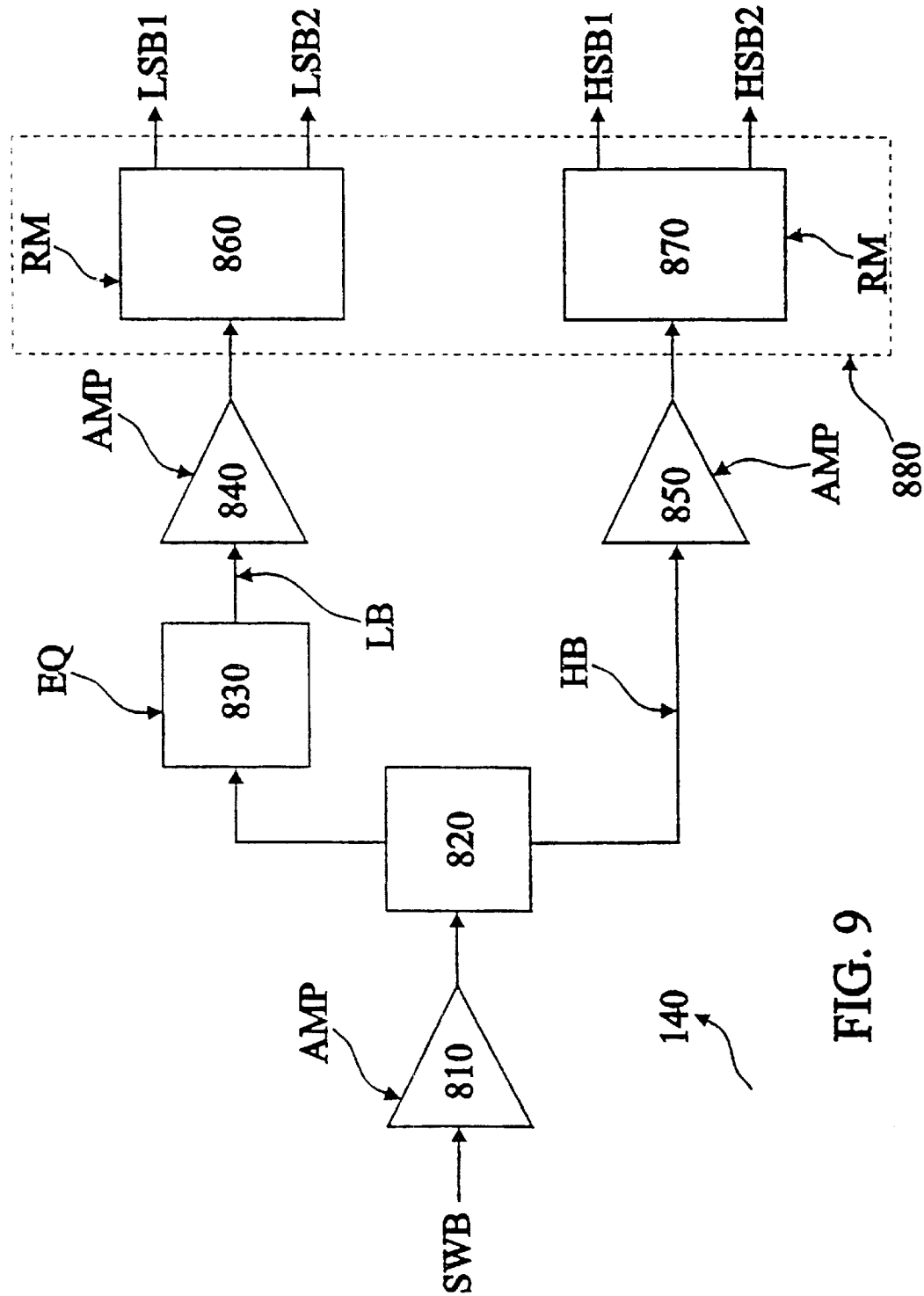
FIG. 9 is a more detailed diagram of the receiver pre-amplifier section of the optical transmission system in FIG. 2.

Following the final span of transmission fiber, RPA section 140 receives the single wide-band (SWB) from OLA section 130 and prepares the signals of the single wide-band for reception and detection at the end of the communication link As shown in FIG. 9, RPA section 140 includes amplifiers (AMP) 810, 840, and 850, filter 820, and equalizing filter 830, and may further include if needed two router modules 860 and 870. Amplifier 810 comprises a rare-earth-doped fiber amplifier. This amplifier 810, which preferably is doped with erbium, amplifies the single wide-band with, for example, a 980 nm pump or some other wavelength to provide a low noise figure for the amplifier, to help improve the signal-to-noise ratio. for the channels in the single wide-band. The single wide-band is in turn separated into the low band and high band by filter 820. In addition, the low band passes through equalizing filter 830. As with TPA section 120 and OLA section 130, amplifier 840 amplifies the low band with, for example, a 980 nm pump, and amplifier 850 amplifies the high band with, for example, a 1480 nm pump. Of course, multiplexed 980 nm pump sources or a high power 980 nm pump can be used for driving the high band amplifier as well. Thus, amplifiers 810, 840, and 850, filter 820, and equalizing filter 830 perform the same functions as amplifiers 610, 640, and 650, filter 620, and equalizing filter 630, respectively, of OLA section 130 and may comprise the same or equivalent parts depending on overall system requirements.

Other structure may be added to RPA section 140 depending on the channel separation capability of demultiplexing section 150. If the channel separation capability of demultiplexing section 150 is for a relatively narrow channel spacing, e.g. a 100 GHz grid, then the optional channel separation structure 880 is typically not needed. However, if the channel separation capability of demultiplexing section 150 is for a relatively wide channel spacing (e.g. 200 GHz grid) while channels in WDM system 100 are densely spaced (e.g. 100 GHz), then RPA section 140 could include the optional structure 880 shown in FIG. 9. In particular, RPA section could have channel separation means, such as router modules 860 and 870.

Router modules 860 and 870 separate the low band and high band into two sub-bands, each sub-band consisting of half the channels of the band, e.g., with a 200 GHz separation between channels. For example, if the low band includes eight channels 1–8, each separated by 100 GHz, then router module 860 would split the low band into low sub-band 1 (LSBI) having channels 1, 3, 5, and 7, and low sub-band 2 (LSB 2 ) having channels 2, 4, 6, and 8. Although each of the eight wavelengths in the low band would have a separation of 100 GHz, the router module 860 would separate the odd and even channels so that the channels in each low sub-band would have double the spacing, i.e. 200 GHz spacing. Router module 870 would split the high band into high sub-band 1 (HSB1) and high sub-band 2 (HSB2) in similar fashion.

In a preferred arrangement, router modules 860 and 870, in general, include for each band a three-port optical circulator, twelve in-fiber Bragg gratings (for 870) in double quantity and four in-fiber Bragg gratings (for 860) in double quantity at interleaved wavelengths to improve isolation, and an optical isolator (all not shown) between the twin gratings. Each module also requires an optical monitor (not shown) at its output and a fiber grating temperature control (not shown). In this configuration, the channels for one of the bands enter a first port of the three-port circulator, rotate within the circulator, and exit at a second port. The second port has a series of Bragg gratings attached that have reflection wavelengths corresponding to every other channel in the band. In this way, every other channel (i.e. every even channel) is reflected, while the remaining channels (i.e. every odd channel) is passed. The reflected channels re-enter the circulator and then exit at a third port. As a result, the circulator and Bragg grating configuration accomplishes a separation of the channel spacing, and in this example, takes one input port and creates two output ports with twice the spacing between channels. Other configurations for the router modules may be employed, for example, using a WDM coupler that has a first series of Bragg gratings attached to a first port and a second series of gratings attached to a second port. The Bragg gratings attached to the first port would have reflection wavelengths that correspond to every other channel (i.e. the even channels), while the Bragg gratings attached to the second port would have reflection wavelengths that correspond to the remaining channels (i.e. the odd channels). This arrangement of gratings will also serve to split the single input path into two output paths with twice the channel-to-channel spacing.

Figure 10A:
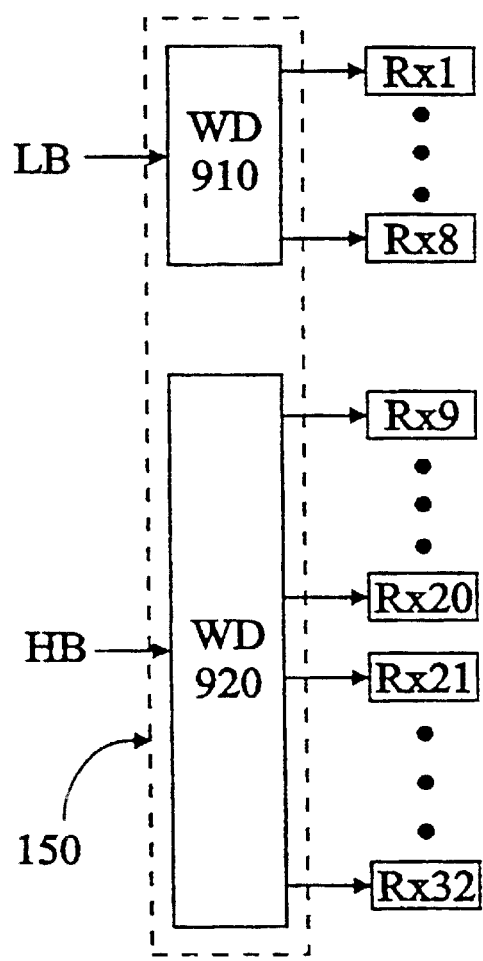
FIGS. 10A and 10B are more detailed diagrams of the demultiplexing section of the optical transmission system in FIG. 2.
Figure 10B:
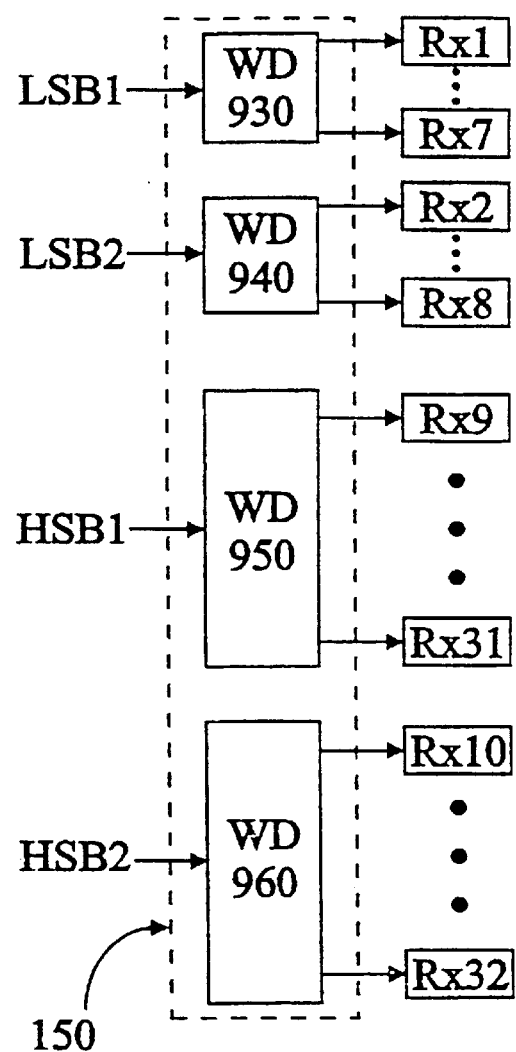

After passing through RPA section 140, the low band and high band or their respective sub-bands are received by demultiplexing section 150. As shown in FIGS. 10A and 10B, the structure of demultiplexing section 150 depends on the separation capability of its demultiplexers.

FIG. 10A illustrates a preferred embodiment when the WDM system 100 uses a relatively narrow channel separation, e.g. 100 GHz separation. In this situation, demultiplexing section 150 uses a wavelength demultiplexer (WD) 910 for the low band (LB) and a WD 920 for the high band (HB). Demultiplexing section 150 in FIG. 10A is connected to a plurality of receiving units Rx1–Rx32 for receiving each individual channel demultiplexed by WDs 910 and 920. The individual channels correspond to output channels 170, as shown in FIG. 2.

WD 910 in FIG. 10A receives the low band, which includes, for example, eight channels. The low band, with the channels spaced at 100 GHz intervals. as shown in Table 1, is separated into its individual channels by WD 910, such as a 1×5 type arrayed waveguide grating (AWG) 100 GHz demultiplexer. Similarly, WD 920, such as a 1×24 type AWG 100 GHz demultiplexer, receives the high band, which includes, for example, twenty-four channels spaced at 100 GHz intervals, and separates the high band into its individual channels. AWG units may be obtained from various suppliers, including Hitachi and PIRI. Output channels 170 are composed of the individual channels produced by WD 910 and 920. Each channel of output channels 170 is received by a respective receiving unit. Receiving units Rx1–Rx32 represent any kind of port, connection, or processing means that is coupled to receive a signal from a particular channel.

FIG. 10B illustrates a configuration for a WDM system 100 that has an alignment of channels such as 100 GHz spacing. This arrangement may be used in conjunction with router modules 860 and 870 that separate the low band and high band into two sub-bands each, such that each sub-band includes half the channels of the corresponding band with a 200 GHz separation between channels. In particular, demultiplexing section 150 in FIG. 10B includes four WDs 930, 940, 950, and 960, although depending on economic and commercial factors, demultiplexing section 150 could include one for each sub-band. Again, the wavelength demultiplexers preferably comprise arrayed waveguide grating devices, but alternate structures for achieving the same or similar wavelength separation are contemplated. For instance, one may use interferential filters, Fabry-Perot filters, or in-fiber Bragg gratings in a conventional manner to demultiplex the channels within the low band (LB), the high band (HB), the low sub-bands (LSB), and the high sub-bands (HSB). Like in FIG. 10A, demultiplexing section 150 also includes receiving units Rx1–Rx 32 for receiving output channels 170.

In a preferred configuration, demultiplexer section 150 in FIG. 10B combines both interferential filter and AWG filter technology. In this manner, WDs 930 and 940, which-are preferably four channel demultiplexers with interferential filters, receive and demultiplex low sub-band 1 and low sub-band 2, respectively. Specifically, WD 930 produces channels 1, 3, 5, and 7, and WD 940 produces channels 2, 4, 6, and 8. Similarly, WDs 950 and 960 receive and demultiplex high sub-band 1 and high sub-band 2, respectively, to produce channels 9–32. Both WD 950 and WD 960, however, may be 1×16 type AWG 200 GHz demultiplexers that are underequipped to use only twelve of the available sixteen demultiplexer ports. Output channels 170 are composed of the individual channels produced by WDs 930, 940, 950, and 960, and each channel of output channels 170 is received by one of receiving units Rx1–Rx32.

Figure 11A:
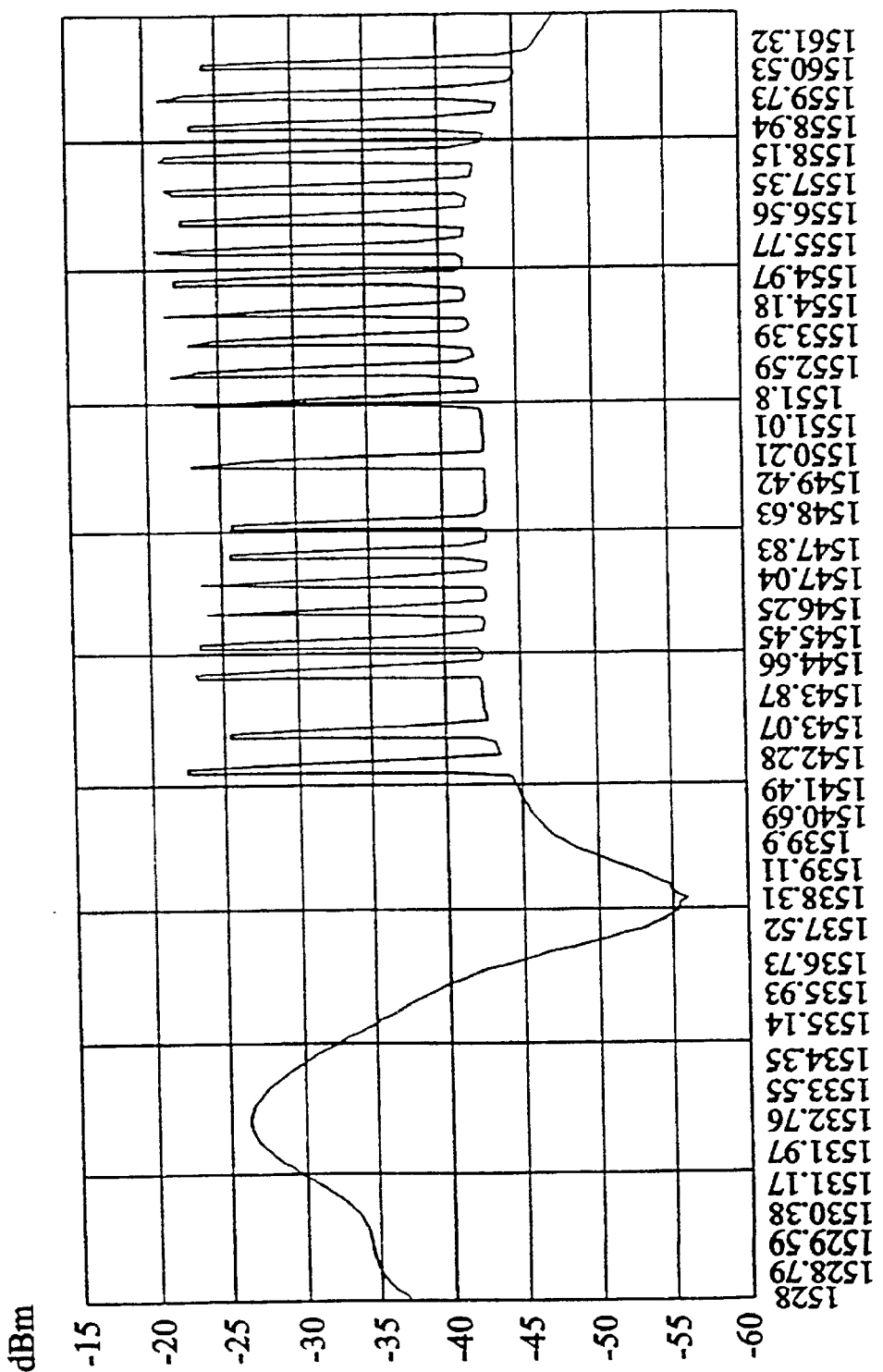
FIG. 11A is an experimental result of a WDM system consistent with the present invention of the high band of twenty-one channels.

FIG. 11A illustrates an experimental result from a portion of the WDM system 100 using the multi-band amplification scheme of the present invention. In the setup for FIG. 11A, a WDM system was arranged using TPA 120 and RPA 140, together with four OLA 130 sections positioned between five transmission fiber spans. As shown in FIG. 11A, only the high band (HB) was employed, i.e. amplifier 650 in the OLA 130 sections and amplifier 850 in RPA 140. The graph depicts the results of twenty-one (21) channels across the high band of a total thirty-two (32) channel system, although the total power was equivalent to twenty-four (24) channels across the high band. As can be seen from FIG. 11A, the high band provides a relatively constant signal level and optical signal-to-noise ratio from channel to channel. For instance, the signal-to-noise ratio varied between about 17 dB and about 21 dB. The large hump evident in the area of the low band is amplified spontaneous emission generated by the amplifiers for the channels that were not applied during the test of the system.

Figure 11B:
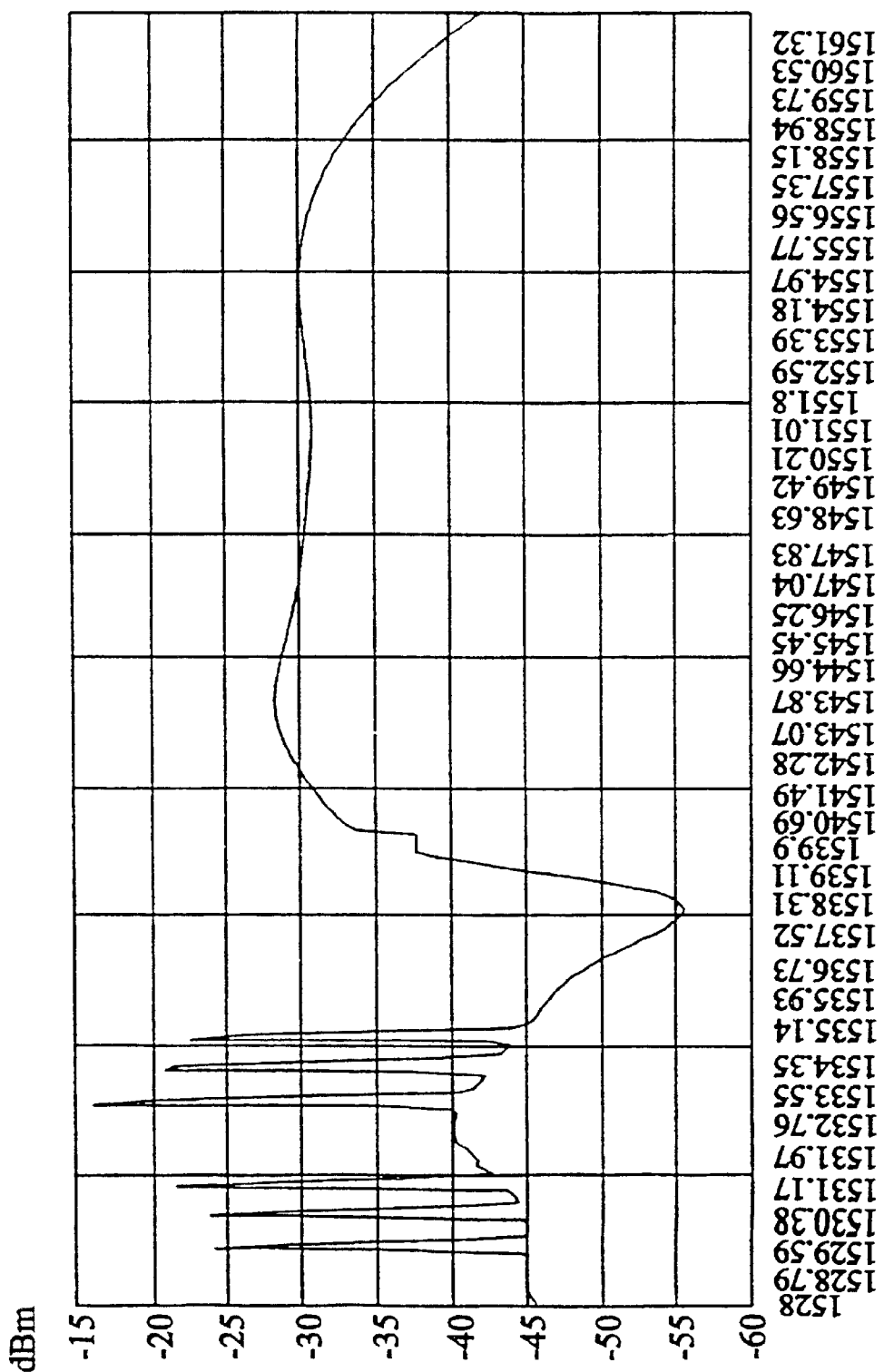
FIG. 11B is an experimental result of a WDM system consistent with the present invention of the low band of six channels.

FIG. 11B illustrates a similar test result to FIG. 11A with the same test setup, except where only the low band channels were used. In other words, equalizing filter 630 and amplifier 640 in the OLA 130 sections and equalizing filter 830 and amplifier 840 in RPA 140 were used but the transmitters for the high band channels were not turned on. The graph depicts the results of six (6) channels across the low band of a total thirty-two (32) channel system, although the total power was equivalent to eight (8) channels across the low band. As can be seen from FIG. 11B, the low band provides a relatively constant level and optical signal to noise ratio from channel to channel. For instance, the signal-to-noise ratio varied between about 24 dB and about 20 dB. The large hump evident in the area of the high band is amplified spontaneous emission generated by the amplifiers for the channels that were not applied to the system during the test.

Figure 11C:
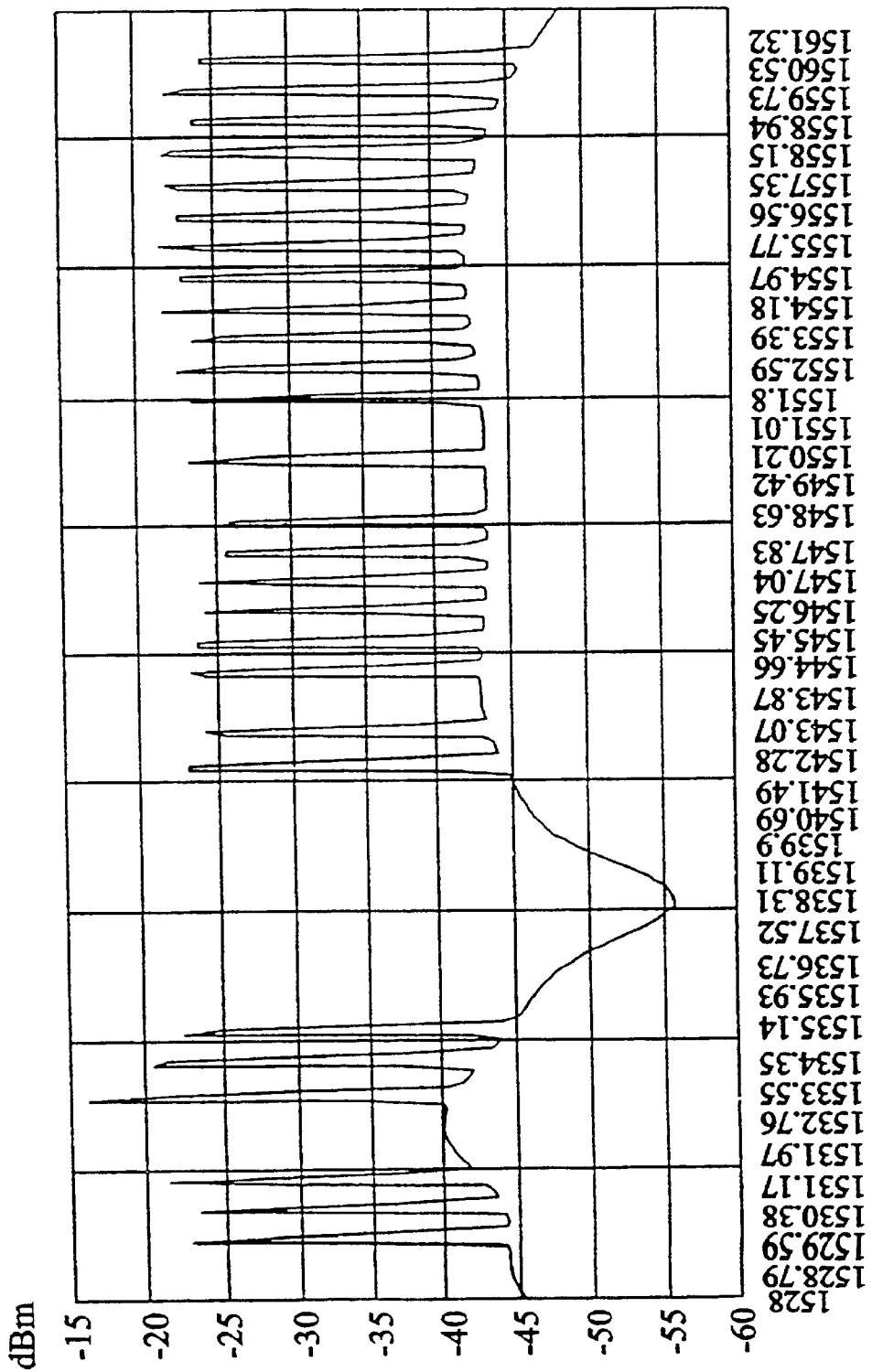
FIG. 11C is an experimental result of a WDM system consistent with the present invention of the wide band of twenty-seven channels.

Finally, FIG. 11C shows the results of the same test setup of a five span system where both the low band and the high band were operating. FIG. 11C depicts the separation between the high band and the low band, with an unused section between about 1536 nm and 1541 nm that has a spectral emission trough. As can be seen from FIG. 11C, the individual channels in both the low band and the high band with the present invention provide a relatively constant output level, which leads to improved detection by the receivers and more reliable transmission for dense wavelength spacing. Moreover, the results in FIG. 11C, when compared with those of FIG. 11A, show that the presence of the low band together with the high band does not affect the output of the high band channels compared to when the high band channels are used alone in the system. Similarly, a comparison of FIG. 11C with FIG. 11B reveals that the presence or absence of the high band channels does not affect the output power of the low band channels, Thus, the system of the present invention using multi-band amplification provides both gain equalization for dense wavelength spacing and relative subband channel independence and robustness. Further, gain tilts in the two bands are independent from each other, and generally smaller than achieved before, thus ensuring a higher span loss dynamic range or, in other words, broadening the range of span loss values that is acceptable for the system.

FIG. 12 is a chart of the preferred maximum span attenuation in dB for various system configurations of WDM system 100. This graph includes the attenuation values applicable to the tests of FIGS. 11A, 11B, and 11C that are reported above for a thirty-two channel system having five transmission spans.

The optical transmission system consistent with the present invention therefore optimizes the use of the entire erbium-doped fiber spectral emission range by separating the range into a low band corresponding to the low end of the range and a high band corresponding to the high end of the range. Since the low band suffers from unequal amplification, the use of an equalizing filter in the low band region flattens the gain for the channels in the low band without resulting in residual gain undulations caused by the application of equalization to the entire range of channels. Also, the use of a first unsaturated amplifier followed by the separation of the wide band into subbands provides a relative independence between the amplification and power of the channels in the sub-bands.

It will be apparent to those skilled in the art that various modifications and variations can be made to disclosed embodiments of the present invention without departing from the scope of the invention. For example, while described in terms of the wavelength band for erbium-doped fiber amplifiers, the present invention applies equally to the wavelength band for other rareearth-doped fiber amplifiers and doping compositions as well and also to other pumping schemes and pumping conditions. Moreover, the system consistent with the present invention may include the separation of the single wide band into multiple sub-bands numbering greater than two. Other embodiments of the invention will be apparent to those skilled in the art from consideration of the specification and practice of the embodiments of the invention disclosed herein. The specification and examples should be considered exemplary, with the true scope of the invention being indicated by the following claims and their full range of equivalents.

What is claimed is:

1. An optical communication system for transmitting optical channels between a transmitter and a receiver using wavelength division multiplexing, comprising:

a wavelength multiplexer optically coupled to the transmitter for multiplexing individual optical channels;

a transmitter power amplifier optically coupled to the wavelength multiplexer for amplifying the multiplexed optical channels;

at least one optical line amplifier being optically coupled to the transmitter power amplifier via an optical transmission fiber;

a receiver pre-amplifier optically coupled to the at least one line amplifier via another optical transmission fiber; and a wavelength demultiplexer optically coupled to the receiver pre-amplifier for separating the multiplexed optical channels into the individual optical channels for passage to the receiver;

said optical communication system characterized in that the at least one optical line amplifier includes:

a first stage of a first fiber amplifier for amplifying the multiplexed optical channels;

a first band separation filter optically coupled to an output of the first stage for splitting the multiplexed optical channels into a first band of wavelengths and a second band of wavelengths, each of said bands covering a range of at least 6 nm;

a second stage of the first fiber amplifier optically coupled to the band separation filter;

a second fiber amplifier optically coupled to the band separation filter and having a first wavelength response characteristic for amplifying the first band;

an equalizing filter, positioned between the band separation filter and the second amplifier, for equalizing the amplification of signals in the first band;

a third fiber amplifier optically coupled to the second stage and having a second wavelength response characteristic, different from the first wavelength response characteristic, for amplifying the second band; and a combiner for multiplexing the first amplified band and the second amplified band back into the multiplexed optical channels.

2. An optical line amplifier for amplifying a plurality of multiplexed channels traveling in a wavelength division multiplexing system, comprising:

a first optical amplifier, optically coupled to receive the multiplexed channels, having a first stage operating in a linear mode and a second stage operating in a saturation mode;

a band separation filter positioned between the first stage and the second stage for passing a first group of the multiplexed channels into the second stage and separating a second group of the multiplexed channels from entering the second stage;

a second optical amplifier, optically coupled to an output of the second stage, having a first wavelength response characteristic for amplifying the first group of the multiplexed channels;

a third optical amplifier, optically coupled to the band separation filter, having a second wavelength response characteristic different from the first wavelength response characteristic for amplifying the second group of the multiplexed channels; and an equalization filter positioned between the band separation filter and the third optical amplifier for flattening the gain response of the third optical amplifier for the second group of the multiplexed channels.

3. A method for transmitting optical signals, comprising the steps of:

amplifying a multiplexed signal having a plurality of optical channels with a first stage of a first amplifier operating in a linear condition;

splitting the multiplexed signal into a first wavelength band and a second wavelength band, each of said bands covering a range of at least 6 nm;

amplifying the first wavelength band with a second stage of the first amplifier operating in a saturation condition;

amplifying the first wavelength band after the second stage with a second amplifier having a first wavelength response characteristic;

filtering the second wavelength band to flatten a gain response; and amplifying the second wavelength band with a third amplifier having a second wavelength response characteristic different from the first wavelength response characteristic.

4. The optical communication system according to claim 1, wherein the individual optical channels includes thirty-two signals, wherein the first band of wavelengths includes eight of the thirty-two signals and the second band of wavelengths includes twenty-four of the thirty-two signals.

5. The optical communication system according to claim 1, wherein the first band of wavelengths includes 1529 nm to 1535 nm and the second band of wavelengths includes 1541 nm to 1561 nm.

6. The optical communication system according to claim 1, wherein the transmitter power amplifier comprises a fourth fiber amplifier for amplifying the first band of wavelengths, a fifth fiber amplifier for amplifying the second band of wavelengths, and a second combiner having a first input coupled to an output of the fourth amplifier and a second input coupled to an output of the fifth amplifier, for multiplexing the first amplified band and the second amplified band into the multiplexed optical channels.

7. The optical communication system according to claim 6, further comprising a de-emphasis filter positioned between the wavelength multiplexer and the second input of said second combiner for equalizing the amplification of signals in the second band.

8. The optical communication system according to claim 7, wherein the fourth amplifier is pumped with light at 980 nm, and wherein the fifth amplifier is pumped with light at one of 980 nm and 1480 nm.

9. The optical communication system according to claim 1, wherein the first stage of the first fiber amplifier operates in a linear mode.

10. The optical communication system according to claim 9, wherein the second stage of the first fiber amplifier operates in a saturation mode.

11. The optical communication system according to claim 1, wherein residual pump light from the first stage of the first fiber amplifier is used to pump the second stage of the first fiber amplifier.

12. The optical communication system according to claim 1, wherein the wavelength multiplexer includes a plurality of wavelength conversion modules each including a photo-diode for converting a received signal to an electrical signal, an optical source for originating an optical carrier signal, and an electro-optic modulator for modulating the optical carrier signal with the received signal to produce one of the individual optical channels.

13. The method according to claim 3, further comprising the step of:

combining the first wavelength band from the second amplifier and the second wavelength band from the third amplifier back into the multiplexed signal.

14. The method according to claim 3, wherein the steps of amplifying include the substeps of:

providing pump energy at a pump wavelength to the first stage; and routing to the second stage residual pump energy not used by the first stage.

* * * * *